United States Patent
Okada et al.

(10) Patent No.: US 11,193,067 B2
(45) Date of Patent: Dec. 7, 2021

(54) LIQUID CRYSTAL ALIGNING AGENT, LIQUID CRYSTAL ALIGNMENT FILM, LIQUID CRYSTAL ELEMENT AND POLYMER

(71) Applicant: JSR CORPORATION, Tokyo (JP)

(72) Inventors: Takashi Okada, Tokyo (JP); Yoshitaka Murakami, Tokyo (JP); Ken-ichi Itou, Tokyo (JP)

(73) Assignee: JSR CORPORATION, Tokyo (JP)

( * ) Notice: Subject to any disclaimer, the term of this patent is extended or adjusted under 35 U.S.C. 154(b) by 340 days.

(21) Appl. No.: 16/342,981

(22) PCT Filed: Oct. 19, 2017

(86) PCT No.: PCT/JP2017/037834
§ 371 (c)(1),
(2) Date: Apr. 18, 2019

(87) PCT Pub. No.: WO2018/074548
PCT Pub. Date: Apr. 26, 2018

(65) Prior Publication Data
US 2020/0048555 A1 Feb. 13, 2020

(30) Foreign Application Priority Data

Oct. 20, 2016 (JP) .............................. JP2016-206306
May 1, 2017 (JP) .............................. JP2017-091428

(51) Int. Cl.
*C09K 19/56* (2006.01)
*C08F 22/02* (2006.01)
*C08F 220/18* (2006.01)
*C08F 220/56* (2006.01)

(52) U.S. Cl.
CPC ............ *C09K 19/56* (2013.01); *C08F 220/18* (2013.01); *C08F 220/56* (2013.01); *C09K 2219/03* (2013.01)

(58) Field of Classification Search
CPC ................................ C08F 22/02; C09K 19/56
See application file for complete search history.

(56) References Cited

U.S. PATENT DOCUMENTS

2014/0154428 A1* 6/2014 Schadt .................. C08F 122/20
428/1.2

FOREIGN PATENT DOCUMENTS

| JP | 2962473 | 10/1999 |
|----|---------|---------|
| JP | 3612308 | 1/2005  |

OTHER PUBLICATIONS

"Office Action of Korea Counterpart Application", dated Jun. 10, 2020, with English translation thereof, p. 1-p. 8.
"Office Action of Taiwan Counterpart Application", dated Mar. 5, 2020, with English translation thereof, p. 1-p. 7.
"International Search Report (Form PCT/ISA/210)" of PCT/JP2017/037834, dated Dec. 5, 2017, with English translation thereof, pp. 1-2.

* cited by examiner

*Primary Examiner* — Vu A Nguyen
(74) *Attorney, Agent, or Firm* — JCIPRNET

(57) ABSTRACT

According to the present invention, a liquid crystal aligning agent is configured to contain a polymer [P] which has a partial structure represented by formula (1) and comprises a photo-alignment group. In formula (1), each of $R^1$ and $R^2$ independently represents a hydrogen atom, a halogen atom or a monovalent organic group having one or more carbon atoms; and each of $X^1$ and $X^2$ independently represents —OH, —NH$_2$ or a monovalent organic group having one or more carbon atoms, provided that at least one of $X^1$ and $X^2$ represents "—OR$^3$" or "—NR$^3$R$^4$" (wherein each of $R^3$ and $R^4$ independently represents a hydrogen atom or a monovalent organic group having one or more carbon atoms).

14 Claims, No Drawings

LIQUID CRYSTAL ALIGNING AGENT, LIQUID CRYSTAL ALIGNMENT FILM, LIQUID CRYSTAL ELEMENT AND POLYMER

TECHNICAL FIELD

This application is a 371 application of the international PCT application serial no. PCT/JP2017/037834, filed on Oct. 19, 2017, which claims the priority benefit of Japan application no. 2016-206306, filed on Oct. 20, 2016 and Japan application no. 2017-091428, filed on May 1, 2017. The entirety of each of the abovementioned patent applications is hereby incorporated by reference herein and made a part of this specification.

The present disclosure relates to a liquid crystal aligning agent, a liquid crystal alignment film, a liquid crystal element and a polymer.

BACKGROUND ART

As liquid crystal elements, various liquid crystal elements such as a liquid crystal element in a horizontal alignment mode using a nematic liquid crystal having positive dielectric anisotropy represented as a twisted nematic (TN) type or a super twisted nematic (STN) type and a vertical alignment (VA) type liquid crystal element in a vertical (homeotropic) alignment mode using a nematic liquid crystal having negative dielectric anisotropy are known. Such liquid crystal elements include a liquid crystal alignment film having a function of aligning liquid crystal molecules in a certain direction.

Generally, a liquid crystal alignment film is formed by applying a liquid crystal aligning agent in which a polymer component is dissolved in an organic solvent to a substrate and heating it. As the polymer component of the liquid crystal aligning agent, a polyamic acid and a soluble polyimide are generally used because they have excellent mechanical strength, liquid crystal alignment properties, and affinity with a liquid crystal.

As a method of imparting a liquid crystal alignment ability to a polymer thin film formed using a liquid crystal aligning agent, a photoalignment method has been proposed as an alternative technology to a rubbing method. The photoalignment method is a method in which polarized or non-polarized radiation light is emitted to a radiation-sensitive organic thin film formed on a substrate to impart anisotropy to the film, and thus alignment of liquid crystals is controlled. According to this method, compared to a rubbing method of the related art, it is possible to reduce an amount of dust generated and static electricity in a process, and it is possible to reduce the occurrence of display defects and a decrease in the yield. In addition, there is an advantage in that it is possible to uniformly impart a liquid crystal alignment ability to an organic thin film formed on a substrate.

As a liquid crystal aligning agent for forming a liquid crystal alignment film according to a photoalignment method, various polymer compositions have been proposed in the related art. For example, as a polymer component, a liquid crystal aligning agent for photoalignment using a polymer having a main skeleton different from that of a polyamic acid and a soluble polyimide is proposed (for example, refer to Patent Literature 1 and Patent Literature 2). Patent Literature 1 discloses a photoalignable composition including a first polymer having poly(maleimide), and poly(maleimide-styrene) as a main chain and a side chain into which a photosensitive group is introduced, and a second polymer having a long chain alkyl group on a side chain. In addition, Patent Literature 2 discloses a liquid crystal aligning agent including a copolymer having a structural unit with a styrene skeleton as a main chain and a cinnamic acid structure in a side chain, and a structural unit with a maleimide skeleton as a main chain and a cinnamic acid structure in a side chain.

REFERENCE LIST

Patent Literature

[Patent Literature 1]
 Japanese Patent No. 2962473
[Patent Literature 2]
 Japanese Patent No. 3612308

SUMMARY OF INVENTION

Technical Problem

When heating at a high temperature is necessary in the formation of a liquid crystal alignment film, a material of a substrate is limited, and, for example, application of a film substrate as a substrate of a liquid crystal element may be limited. In addition, in a color liquid crystal display element, a dye used in a coloring agent for a color filter is relatively weak with respect to heat, and when it is necessary to perform heating at a high temperature during formation of a film, use of the dye may be limited. In recent years, in order to address such problems, it has been required to use a low boiling point solvent as a solvent component of a liquid crystal aligning agent in some cases. However, solvents having sufficiently high solubility with respect to a polymer component of a liquid crystal aligning agent and a sufficiently low boiling point are actually limited. In addition, when a polymer component is not uniformly dissolved in a solvent, there are concerns of the occurrence of coating irregularities (the irregular film thickness) and pinholes in a liquid crystal alignment film formed on the substrate and linearity not being secured at an end of a coating area and a flat surface not being obtained. In this case, there is a risk of a product yield decreasing, and display performance such as liquid crystal alignment properties, electrical characteristics, and the like being influenced.

As a method of improving solubility of a polymer component in a liquid crystal aligning agent with respect to a solvent, for example, it is conceivable to use a polymer component different from a polyamic acid or a soluble polyimide like a maleimide polymer. However, the maleimide polymers described in Patent Literature 1 and Patent Literature 2 have a relatively rigid structure, and there is still room for improvement in terms of solubility with respect to a solvent.

In particular, in recent years, as large-screen and high definition liquid crystal televisions have become mainstream and small display terminals such as smartphones and tablet PCs have become widespread, the demand for higher-quality liquid crystal panels has been further increasing. Therefore, it is important to further improve liquid crystal alignment properties and electrical characteristics and secure excellent display quality.

The present disclosure has been made in view of the above circumstances, and an objective of the present disclosure is to provide a liquid crystal aligning agent with which it is possible to obtain a liquid crystal element in which coating properties with respect to a substrate are favorable and liquid crystal alignment properties and a voltage holding ratio are excellent.

Solution to Problem

According to the present disclosure, the following aspects are provided.

[1] A liquid crystal aligning agent including a polymer [P] having a partial structure represented by the following Formula (1) and a photoalignable group.

[Chem. 1]

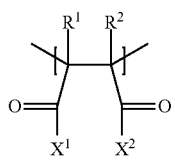

(1)

(In Formula (1), $R^1$ and $R^2$ are independently a hydrogen atom, a halogen atom or a monovalent organic group having 1 or more carbon atoms, and $X^1$ and $X^2$ are independently —OH, —NH$_2$ or a monovalent organic group having 1 or more carbon atoms, provided that at least one of $X^1$ and $X^2$ is "—OR$^3$" or "—NR$^3$R$^4$" (wherein $R^3$ and $R^4$ are independently a hydrogen atom or a monovalent organic group having 1 or more carbon atoms).)

[2] A liquid crystal alignment film formed using the liquid crystal aligning agent according to [1].

[3] A liquid crystal element including the liquid crystal alignment film according to [2].

[4] A polymer having a partial structure represented by Formula (1) and a photoalignable group.

Advantageous Effects of Invention

According to the liquid crystal aligning agent including the polymer [P], it is possible to obtain a liquid crystal element in which liquid crystal alignment properties and a voltage holding ratio are excellent. In addition, the liquid crystal aligning agent including the polymer [P] has excellent coating properties with respect to a substrate and thus it is possible to prevent a product yield from decreasing. In addition, even if a low boiling point solvent is used as a solvent component, it is possible to obtain a liquid crystal element having excellent coating properties with respect to a substrate (reducing the irregular film thickness and pinholes, and securing linearity and flatness at an end of a coating area) and having favorable liquid crystal alignment properties and electrical characteristics.

DESCRIPTION OF THE EMBODIMENTS

<<Liquid Crystal Aligning Agent>>

A liquid crystal aligning agent of the present disclosure includes the following polymer [P]. Hereinafter, components contained in the liquid crystal aligning agent of the present disclosure and other components that are optionally added as necessary will be described.

<Polymer [P]>

The polymer [P] is a polymer having a partial structure represented by Formula (1) (hereinafter referred to as a "structural unit U1") and a photoalignable group. Here, Formula (1) does not limit an isomer structure.

(Structural Unit U1)

Regarding $R^1$ and $R^2$ in Formula (1), examples of a halogen atom include a fluorine atom, a chlorine atom, a boron atom, and an iodine atom, and a fluorine atom is preferable. Examples of a monovalent organic group having 1 or more carbon atoms include a monovalent hydrocarbon group having 1 to 10 carbon atoms. $R^1$ and $R^2$ are preferably a hydrogen atom, a fluorine atom or an alkyl group having 1 to 3 carbon atoms.

Here, in this specification, the term "hydrocarbon group" refers to chain hydrocarbon groups, alicyclic hydrocarbon groups, and aromatic hydrocarbon groups. "Chain hydrocarbon group" refers to linear hydrocarbon groups and branched hydrocarbon groups which do not have a ring structure in the main chain and are formed of only a chain structure. However, the group may be saturated or unsaturated. "Alicyclic hydrocarbon group" refers to hydrocarbon groups having only an alicyclic hydrocarbon structure as a ring structure without an aromatic ring structure. However, the alicyclic hydrocarbon group does not need to be formed of only an alicyclic hydrocarbon structure and it may have a chain structure in a part thereof. "Aromatic hydrocarbon group" refers to hydrocarbon groups having an aromatic ring structure as a ring structure. However, the aromatic hydrocarbon group does not need to be formed of only an aromatic ring structure but it may have a chain structure or an alicyclic hydrocarbon structure in a part thereof.

Regarding $X^1$ and $X^2$, examples of a monovalent organic group having 1 or more carbon atoms include a monovalent hydrocarbon group having 1 to 30 carbon atoms, a group in which at least one methylene group of the hydrocarbon group is substituted with —O—, —CO—, —COO— or —NR$^{16}$— (wherein $R^{16}$ is a hydrogen atom or a monovalent hydrocarbon group, hereinafter the same) (hereinafter referred to as a "group a"), a group in which at least one hydrogen atom of the monovalent hydrocarbon group having 1 to 30 carbon atoms or the group a is substituted with a fluorine atom or a cyano group, a monovalent group having a photoalignable group, and a group having a crosslinkable group.

Regarding $X^1$ and $X^2$, at least one of $X^1$ and $X^2$ is "—OR$^3$" or "—NR$^3$R$^4$" (wherein $R^3$ and $R^4$ are independently a hydrogen atom or a monovalent organic group having 1 or more carbon atoms, hereinafter the same). Examples of monovalent organic groups of $R^3$ and $R^4$ include a monovalent hydrocarbon group, a group in which at least one methylene group of the hydrocarbon group is substituted with —O—, —CO—, —COO— or —NR$^{16}$— (hereinafter referred to as a "group R"), a group in which at least one hydrogen atom of the monovalent hydrocarbon group having 1 to 30 carbon atoms or the group P is substituted with a fluorine atom or a cyano group, a monovalent group having a photoalignable group, and a group having a crosslinkable group. In order to obtain a sufficient effect of improving coating properties of the liquid crystal aligning agent and liquid crystal alignment properties and electrical characteristics of the liquid crystal element, particularly preferably, both $X^1$ and $X^2$ are independently "—OR$^3$" or "—NR$^3$R$^4$."

(Photoalignable Group)

The photoalignable group of the polymer [P] is preferably a functional group that imparts anisotropy to a film according to photoisomerization, a photo dimerization reaction, an optical Fries rearrangement reaction or a photolysis reaction due to light emission. Specific examples of the photoalignable group include, for example, an azobenzene-containing group having azobenzene or its derivative as a basic skeleton, a cinnamic-acid-structure-containing group having cinnamic acid or its derivative (cinnamic acid structure) as a basic skeleton, a chalcone-containing group having chalcone or its derivative as a basic skeleton, a benzophenone-containing group having benzophenone or its derivative as a basic skeleton, a coumarin-containing group having coumarin or its derivative as a basic skeleton, and a cyclobutane-containing structure having cyclobutane or its derivative as a basic skeleton. Among these, the photoalignable group is preferably a cinnamic-acid-structure-containing group and specifically, is preferably a group having a cinnamic acid structure represented by the following Formula (6) as a basic skeleton because it has high sensitivity with respect to light and is easily introduced into a polymer side chain.

[Chem. 2]

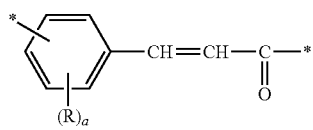

(6)

(In Formula (6), R is an alkyl group having 1 to 10 carbon atoms which optionally has a fluorine atom or a cyano group, an alkoxy group having 1 to 10 carbon atoms which optionally has a fluorine atom or a cyano group, a fluorine atom, or a cyano group; a is an integer of 0 to 4; when a is 2 or more, a plurality of R's may be the same or different from each other; and "*" represents a binding site.)

In the structure represented by Formula (6), it is preferable that one of two binding sites "*" be bonded to a group represented by the following Formula (4). This case is suitable because it makes it possible to further improve liquid crystal alignment properties of the obtained liquid crystal element.

[Chem. 3]

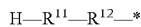 (4)

(In Formula (4), $R^{11}$ is a phenylene group, a biphenylene group, a terphenylene group or a cyclohexylene group, and may have, in a ring part, an alkyl group having 1 to carbon atoms, an alkoxy group having 1 to 10 carbon atoms, an alkyl group having 1 to 10 carbon atoms in which at least one hydrogen atom is substituted with a fluorine atom or a cyano group, an alkoxy group having 1 to 10 carbon atoms in which at least one hydrogen atom is substituted with a fluorine atom or a cyano group, a fluorine atom, or a cyano group; when $R^{12}$ is bonded to a phenyl group in Formula (6), it is a single bond, an alkanediyl group having 1 to 3 carbon atoms, an oxygen atom, a sulfur atom, —CH=CH—, —NH—, —COO—, or —OCO—; when $R^{12}$ is bonded to a carbonyl group in Formula (6), it is a single bond, an alkanediyl group having 1 to 3 carbon atoms, an oxygen atom, a sulfur atom, or —NH—; and "*" represents a binding site.)

In the group represented by Formula (4), $R^{11}$ preferably has a fluorinated alkyl group or a cyano-group-containing alkyl group. The fluorinated alkyl group and the cyano-group-containing alkyl group preferably have 2 to 20 carbon atoms and more preferably have 3 to 18 carbon atoms.

In the polymer [P], the photoalignable group may be contained in the structural unit U1 and may be contained in a structural unit (hereinafter referred to as "other structural unit") different from the structural unit U1. In order to obtain a sufficient effect of improving alignment characteristics and electrical characteristics of the liquid crystal element and an excellent effect of improving coating properties with respect to a substrate, the structural unit U1 preferably has a photoalignable group. Here, only one of the structural unit U1 and the other structural unit may have a photoalignable group, and two or more structural units may have a photoalignable group.

As the polymer [P], among them, a monovalent group in which one of $X^1$ and $X^2$ in Formula (1) has a photoalignable group is preferable, and a monovalent group in which one of $X^1$ and $X^2$ in Formula (1) has a photoalignable group and the other thereof is —OH, —OR$^{6'}$—NH$_2$, —NHR$^6$ or —NR$^6$R$^7$ (wherein R$^6$ and R$^7$ are independently a monovalent hydrocarbon group having 1 to 6 carbon atoms) is more preferable. In particular, when any of $X^1$ and $X^2$ is a hydroxyl group, this is suitable because it enhances an effect of improving coating properties.

A content proportion of the photoalignable group is preferably 1 to 70 mol % and more preferably 3 to 60 mol % with respect to a total amount of monomers used for synthesizing the polymer [P].

In order to obtain sufficient effects of the present disclosure, the polymer [P] preferably has at least one of the following (x1) and (x2) on a side chain and particularly preferably has (x1) and (x2).

(x1) At least one ring structure selected from the group consisting of rings represented by the following Formula (2) and cyclic carbonates (hereinafter referred to as a "ring structure A").

(x2) A functional group that reacts with at least one of an oxetanyl group and an oxiranyl group by heating (hereinafter referred to as a "reactive functional group").

[Chem. 4]

 (2)

(In Formula (2), $Y^1$ is an oxygen atom, a sulfur atom or —NR$^3$— (wherein R$^3$ is a hydrogen atom or an alkyl group having 1 to 6 carbon atoms), and R$^5$ is a single bond or a methylene group.)

(Ring Structure A)

The polymer [P] preferably has a ring structure A on a side chain because this makes it possible to obtain a liquid crystal alignment film having excellent liquid crystal alignment properties.

Examples of the ring represented by Formula (2) include an oxetane ring, an oxirane ring, a thiirane ring, a thietane ring, an aziridine ring, an azetidine ring, and N-methylethyleneimine ring. Among them, an oxetane ring or an oxirane ring is preferable. Examples of the cyclic carbonate include ethylene carbonate, and propylene carbonate.

In the polymer [P], any of the structural unit U1 and the other structural unit may have the ring structure A. The other structural unit preferably has the ring structure A because this allows alignment characteristics of the liquid crystal element to be more favorable, makes it easy to adjust an amount of the ring structure A introduced, and increases a degree of freedom in selection of a monomer. Here, only one of the structural unit U1 and the other structural unit may have the ring structure A, and two or more structural units may have the ring structure A. A content proportion of the ring structure A is preferably 1 to 90 mol % and more preferably 2 to 80 mol % with respect to a total amount of monomers used for synthesizing the polymer [P].

(Reactive Functional Group)

In order to obtain a sufficient effect of improving liquid crystal alignment properties, the polymer [P] preferably has a reactive functional group. Examples of the reactive functional group include a carboxyl group, a hydroxyl group, an isocyanate group, and an amino group, a group in which these groups are protected with a protecting group, and an alkoxymethyl group. Among these, the reactive functional group is preferably at least one selected from the group consisting of a carboxyl group and a protected carboxyl group (hereinafter referred to as a "protected carboxyl group") because it has favorable storage stability and high reactivity by heating.

The protected carboxyl group is not particularly limited as long as it is separated by heat and generates a carboxyl group. Specific examples of the protected carboxyl group preferably include a structure represented by the following Formula (3), an acetal ester structure of a carboxylic acid, and a ketal ester structure of a carboxylic acid.

[Chem. 5]

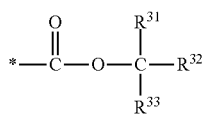

(3)

(In Formula (3), $R^{31}$, $R^{32}$ and $R^{33}$ are independently an alkyl group having 1 to carbon atoms or a monovalent alicyclic hydrocarbon group having 3 to 20 carbon atoms, or $R^{31}$ and $R^{32}$ are bonded to each other and form a divalent alicyclic hydrocarbon group or cyclic ether group having 4 to 20 carbon atoms together with carbon atoms to which $R^{31}$ and $R^{32}$ are bonded, and $R^{33}$ is an alkyl group having 1 to 10 carbon atoms, an alkenyl group having 2 to 10 carbon atoms or an aryl group having 6 to 20 carbon atoms; and "*" represents a binding site.)

In the polymer [P], any of the structural unit U1 and the other structural unit may have the reactive functional group. Examples of a case in which the structural unit U1 has a reactive functional group include a case in which at least one of $X^1$ and $X^2$ is a hydroxyl group and a case in which at least one of $X^1$ and $X^2$ has a carboxyl group. The other structural unit preferably has a reactive functional group because this increases a degree of freedom in selection of a monomer, makes it easy to adjust an amount of the reactive functional group introduced, and improves coating properties (printability) due to introduction of a flexible or polar structure. Here, only one of the structural unit U1 and the other structural unit may have a reactive functional group, and two or more structural units may have a reactive functional group. A content proportion of the reactive functional group is preferably 1 to 95 mol % and more preferably 5 to 90 mol % with respect to a total amount of monomers used for synthesizing the polymer [P].

(Other Structural Unit)

The polymer [P] may be a polymer composed of only the structural unit U1. However, in order to secure sufficient reliability of the liquid crystal element, further improve stability of an alignment film during glass polishing, and further improve coating properties with respect to a substrate, the polymer [P] is preferably a copolymer having the structural unit U1 and a structural unit U2 derived from at least one monomer selected from the group consisting of styrene monomers and (meth)acrylic monomers.

Structural Unit U2

The styrene monomer is a compound having a group obtained by removing at least one hydrogen atom from a substituted or unsubstituted benzene ring of styrene, and is preferably a group represented by the following Formula (z-5-1). A (meth)acryloyl group of a (meth)acrylic monomer is an "acryloyl group" or a "methacryloyl group."

[Chem. 6]

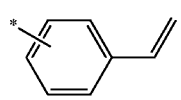

(z-5-1)

(In the expression, "*" represents a binding site.)

As the polymer [P], among them, a copolymer having a structural unit derived from the styrene monomer and the structural unit U1 is preferable because it makes it possible to obtain a liquid crystal element having more excellent coating properties with respect to a substrate and a more improved voltage holding ratio and also makes it possible to secure thermal stability on a side chain.

A content proportion of the structural unit U2 in the polymer [P] is preferably 1 to 95 mol % and more preferably 2 to 90 mol % with respect to a total amount of structural units derived from monomers constituting the polymer [P]. In addition, a content proportion of the structural unit derived from the styrene monomer is preferably 1 to 70 mol % and more preferably 3 to 60 mol % with respect to a total amount of structural units derived from monomers constituting the polymer [P].

Structural Unit U3

The polymer [P] may further have a structural unit (hereinafter referred to as a "structural unit U3") different from the structural unit U1 and the structural unit U2. The structural unit U3 is not particularly limited, and examples thereof include a structural unit derived from a conjugated diene compound, a structural unit derived from a monomer having a maleimide ring, and a structural unit derived from maleic anhydride. A content proportion of the structural unit U3 in the polymer [P] is preferably 70 mol % or less and more preferably 60 mol % or less with respect to a total amount of structural units derived from monomers constituting the polymer [P].

(Synthesis of Polymer [P])

A method of synthesizing the polymer [P] is not particularly limited, and synthesis can be performed by appropriately combining organic chemistry methods. Examples of the method of synthesizing the polymer [P] include the following Methods 1 to 4. Among them, in order to reduce the number of processes when the polymer [P] is produced, Method 1 or Method 4 is preferably used.

Method 1: a method of polymerizing using monomers having a group represented by the following Formula (z-4-1).

[Chem. 7]

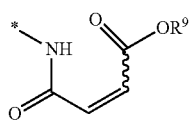

(z-4-1)

(In Formula (z-4-1), $R^9$ is a hydrogen atom or a monovalent organic group having 1 or more carbon atoms; "*" represents a binding site; and the wave line in the formula represents that an isomer structure is arbitrary.)

Method 2: a method in which, according to the following scheme, monomers represented by the following Formula (m-1) are polymerized to obtain a polymer having a partial structure represented by the following Formula (1-A), and next, the polymer having a partial structure represented by the following Formula (1-A) and a compound represented by the following Formula (g-1) are reacted.

[Chem. 8]

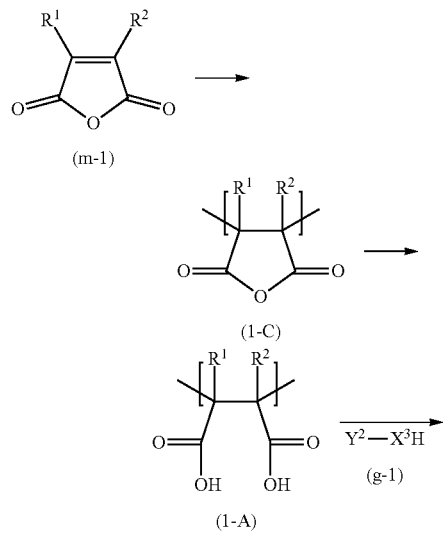

(In the expression, $Y^2$ is a monovalent organic group and $X^3$ is an oxygen atom or —$NR^{17}$— ($R^{17}$ is a hydrogen atom or a monovalent hydrocarbon group having 1 to 5 carbon atoms); and $R^1$, $R^2$, $X^1$ and $X^2$ have the same meanings as in Formula (1).)

Method 3: a method in which, according to the following scheme, a polymer (half ester) having a partial structure represented by the following Formula (1-B) is obtained, and next, a polymer having a partial structure represented by the following Formula (1-B) and a compound represented by the following Formula (g-1) are reacted.

[Chem. 9]

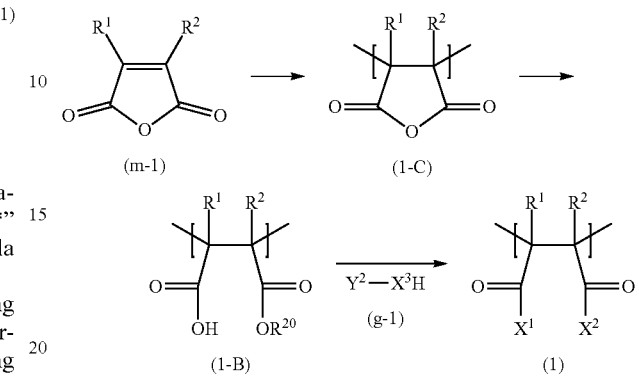

(In the expression, $Y^2$ and $X^3$ have the same meanings as in Method 2, $R^{20}$ is a monovalent hydrocarbon group; and $R^1$, $R^2$ and $X^1$ have the same meanings as in Formula (1).)

Method 4: a method in which, according to the following scheme, a polymer having a partial structure represented by the following Formula (1-C) is obtained, and next, an acid anhydride group having a partial structure represented by the following Formula (1-C) and a compound represented by the following Formula (g-1) are reacted.

[Chem. 10]

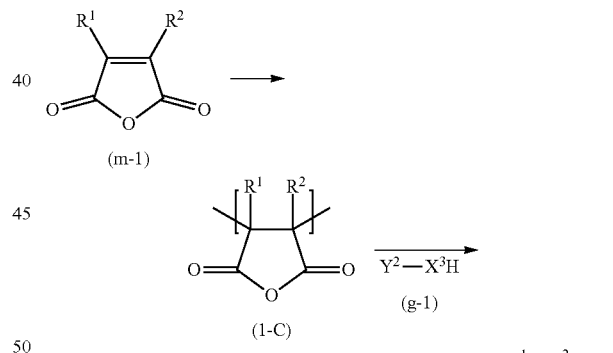

(In the expression, $Y^2$ and $X^3$ have the same meanings as in Method 2. $R^1$, $R^2$ and $X^1$ have the same meanings as in Formula (1).)

(Method 1)

In Method 1, using a compound represented by the following Formula (2A), preferably, monomers including one, two or more types of the compound and at least one monomer selected from the group consisting of styrene monomers and (meth)acrylic monomers are polymerized.

[Chem. 11]

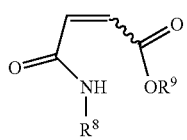
(2A)

(In Formula (2A), $R^8$ is a monovalent organic group having 1 or more carbon atoms, and $R^9$ is a hydrogen atom or a monovalent organic group having 1 or more carbon atoms. The wavy line in Formula (2A) indicates that the isomer structure is arbitrary.)

In Formula (2A), for monovalent organic groups of $R^8$ and $R^9$, descriptions of the monovalent organic groups of $R^3$ and $R^4$ in Formula (1) apply similarly. $R^8$ is preferably a monovalent organic group having a photoalignable group and is more preferably a group having a cinnamic acid structure represented by Formula (6) as a basic skeleton. In order to enhance an effect of improving coating properties, $R^9$ is preferably a hydrogen atom or a monovalent hydrocarbon group having 1 to 6 carbon atoms, more preferably a hydrogen atom or an alkyl group having 1 to 3 carbon atoms, and particularly preferably a hydrogen atom.

According to Method 1, in a case of a polymer having a photoalignable group, a ring structure A and a reactive functional group is obtained as the polymer [P], in order to increase efficiency of introduction of the photoalignable group, the ring structure A, and the reactive functional group, as polymerization monomers, a monomer (m1) having a ring structure A, a monomer (m2) having a reactive functional group, and a monomer (m3) having a photoalignable group are preferably used for polymerization.

The monomer (m1) having a ring structure A is preferably a monomer having an epoxy group (including an oxetanyl group and an oxiranyl group) or a protected epoxy group. Specific examples thereof include, as a maleimide-ring-containing compound, for example, N-(4-glycidyloxyphenyl)maleimide, and N-glycidyl maleimide;

as a (meth)acrylic monomer, for example, glycidyl(meth) acrylate, glycidyl α-ethylacrylate, α-n-propyl glycidyl acrylate, α-n-butyl acrylate glycidyl, (meth)acrylate 3,4-epoxybutyl, α-ethyl acrylate 3,4-epoxy butyl, 3,4-epoxycyclohexylmethyl(meth)acrylate, 6,7-epoxyheptyl (meth)acrylate, α-ethyl acrylate 6,7-epoxyheptyl, 4-hydroxybutyl glycidyl ether acrylate, (3-ethyloxetan-3-yl) methyl(meth)acrylate, and (meth)acrylic acid(2-oxo-1,3-dioxolan-4-yl)methyl; and as a styrene monomer, for example, 3-(glycidyloxymethyl)styrene, 4-(glycidyloxymethyl)styrene, and 4-glycidyl-α-methyl styrene. Here, as the monomer (m1), one thereof may be used alone or two or more thereof may be used in combination.

Specific examples of the monomer (m2) having a reactive functional group include, as a maleimide-ring-containing compound, for example, 3-maleimidobenzoic acid, 3-maleimidopropionic acid, 3-(2,5-dioxo-3-pyrrolin-1-yl)benzoate, 4-(2,5-dioxo-3-pyrrolin-1-yl)benzoate, and methyl 4-(2,5-dioxo-3-pyrrolin-1-yl)benzoate;

as a (meth)acrylic monomer, for example, a carboxyl-group-containing compound such as (meth)acrylic acid, α-ethyl acrylic acid, maleic acid, fumaric acid, crotonic acid, citraconic acid, mesaconic acid, and itaconic acid, an unsaturated polycarboxylic anhydride such as maleic anhydride, and protected-carbonyl-group-containing compounds represented by the following Formula (m2-1) to Formula (m2-12):

[Chem. 12]

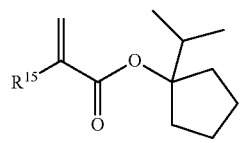
(m2-1)

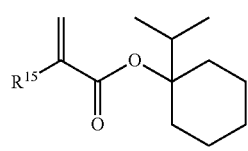
(m2-2)

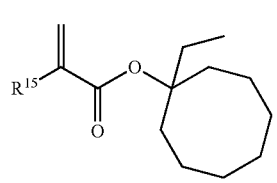
(m2-3)

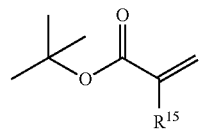
(m2-4)

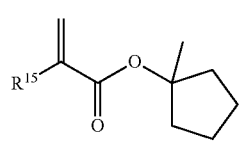
(m2-5)

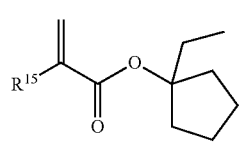
(m2-6)

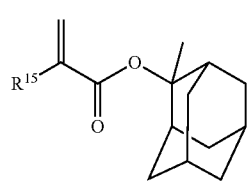
(m2-7)

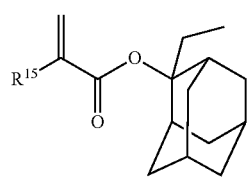
(m2-8)

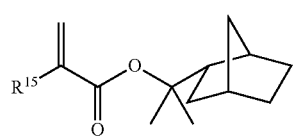
(m2-9)

(m2-10)

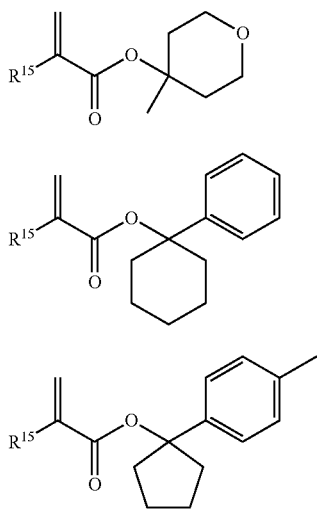

(m2-11)

(m2-12)

(in Formula (m2-1) to Formula (m2-12), $R^{15}$ is a hydrogen atom or a methyl group); and as a styrene monomer, for example, 3-vinylbenzoic acid, and 4-vinylbenzoic acid. Here, as the monomer (m2), one thereof can be used alone or two or more thereof can be used in combination.

Examples of the monomer (m3) having a photoalignable group include a compound represented by the following Formula (5):

[Chem. 13]

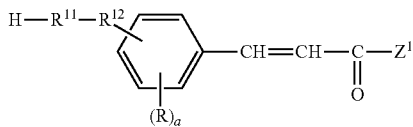

(5)

(in Formula (5), $Z^1$ is a monovalent organic group having a polymerizable unsaturated bond. R and a have the same meanings as in Formula (6), and $R^{11}$ and $R^{12}$ have the same meanings as in Formula (4)).

Specific examples of $Z^1$ in Formula (5) include groups represented by the following Formula (z-1) to Formula (z-5). Among them, in order to improve coating properties (specifically, flatness of the coating film and wettability of the edge part) with respect to a substrate and obtain an excellent effect of improving layer separable properties in the case of a blended system, a group represented by the following Formula (z-4) is particularly preferable.

[Chem. 14]

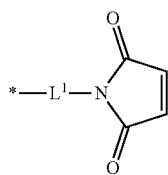

(z-1)

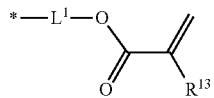

(z-2)

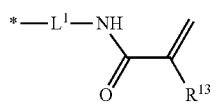

(z-3)

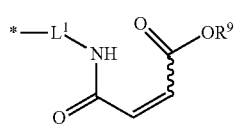

(z-4)

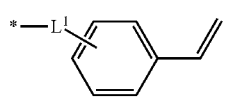

(z-5)

(in the expression, $L^1$ is a divalent linking group; $R^{13}$ is a hydrogen atom or a methyl group, and $R^9$ is a hydrogen atom or a monovalent organic group having 1 or more carbon atoms; "*" represents a binding site; and the wavy line in Formula (z-4) indicates that the isomer structure is arbitrary).

In Formula (z-1) to Formula (z-5), the divalent linking group of $L^1$ is preferably a divalent hydrocarbon group having 1 to 20 carbon atoms or a group in which at least one methylene group of the hydrocarbon group is substituted with —O—, —CO—, or —COO—. Specific examples of a hydrocarbon group of $L^1$ include a divalent chain hydrocarbon group, an alicyclic hydrocarbon group, and an aromatic hydrocarbon group. $R^9$ has the same meaning as in Formula (2A).

Specific examples of the monomer (m3) having a photoalignable group include, as a compound represented by Formula (2A), for example, compounds represented by the following Formulae (m3-4) to (m3-8);

as a maleimide-ring-containing compound, for example, compounds represented by the following Formulae (m3-1) to (m3-3), and (m3-14) to (m3-16);

as a (meth)acrylic monomer, for example, compounds represented by the following Formulae (m3-9) to (m3-11), and (m3-13); and as a styrene monomer, a compound represented by the following Formula (m3-12). As the monomer (m3), one thereof can be used alone or two or more thereof can be used in combination. Here, the following Formula (m3-4) to Formula (m3-8) do not limit an isomer structure, and include a trans form and a cis form.

[Chem. 15]
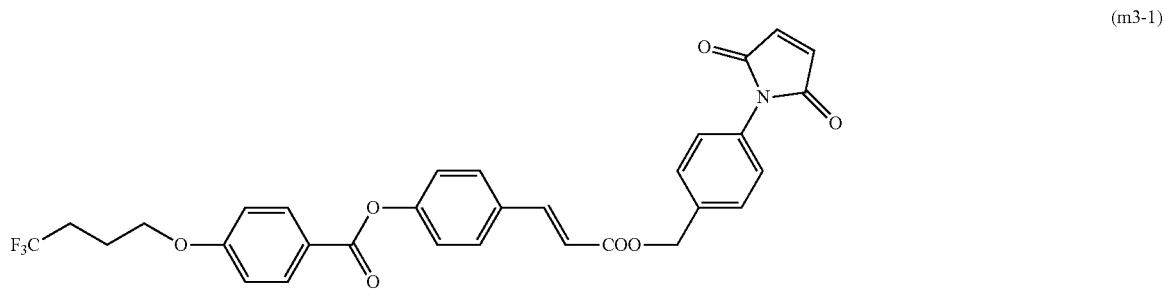
(m3-1)
(m3-2)
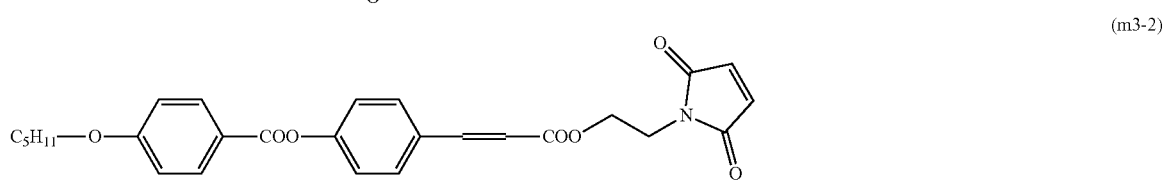
(m3-3)
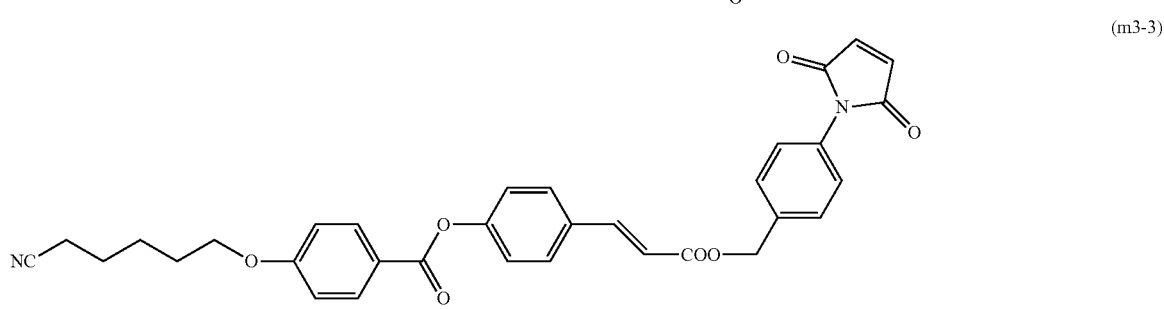
(m3-4)
[Chem. 16]
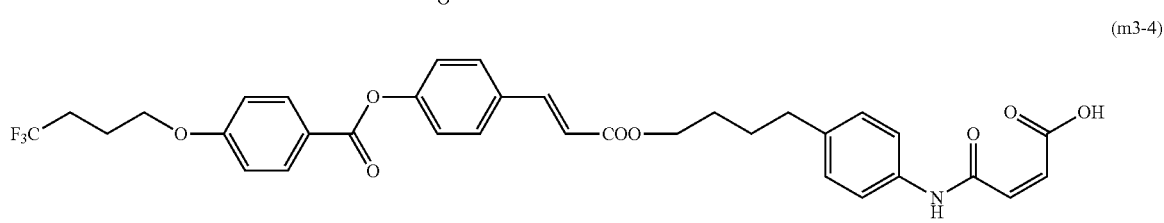
(m3-5)
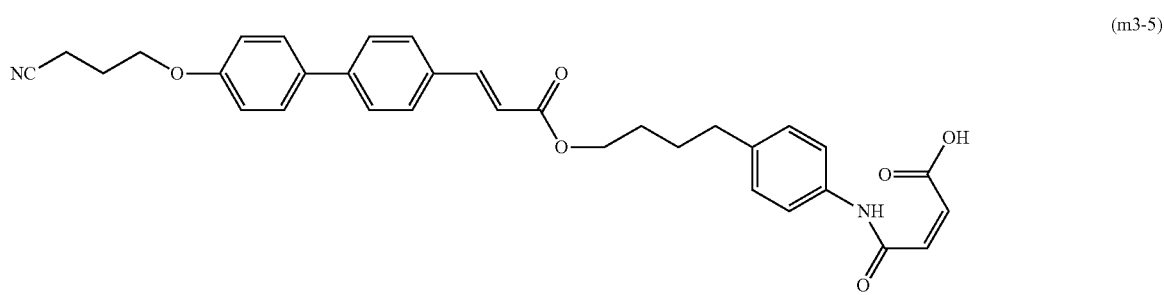
(m3-6)
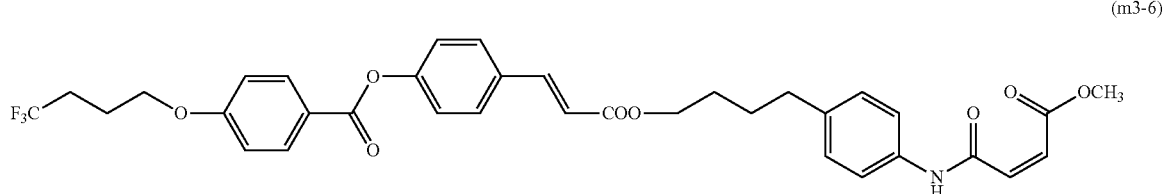
(m3-7)
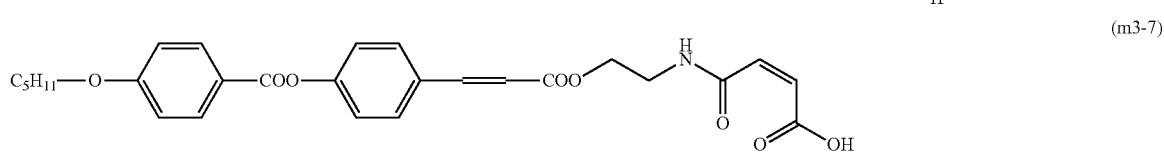

(m3-8)
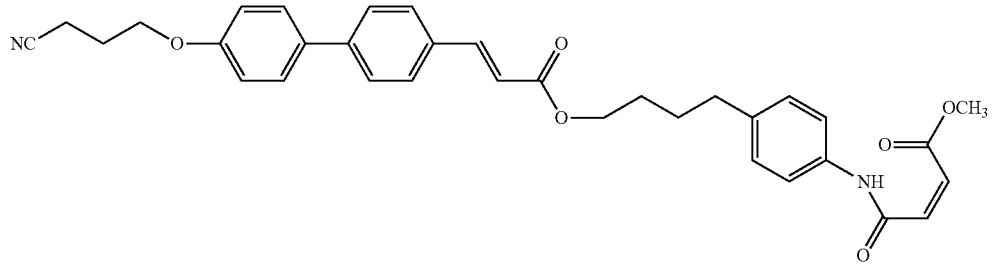
[Chem. 17]
(m3-9)
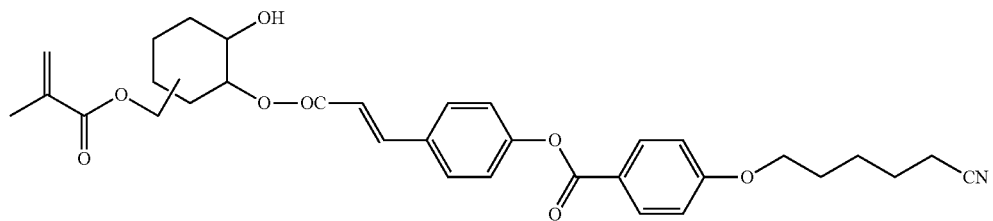
(m3-10)
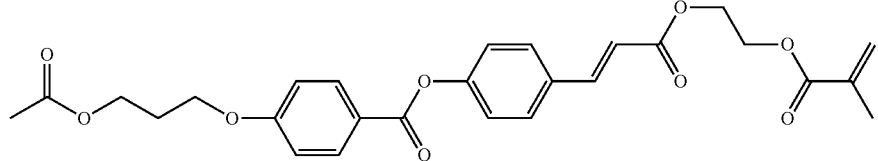
(m3-11)
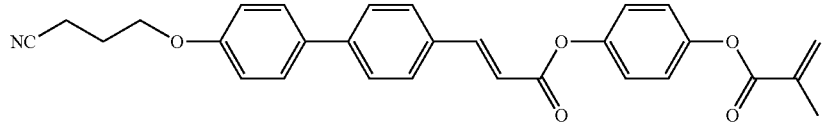
(m3-12)
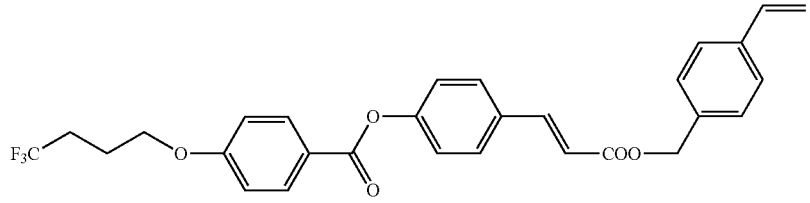
(m3-13)
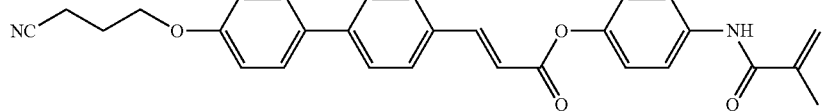
[Chem. 18]
(m3-14)
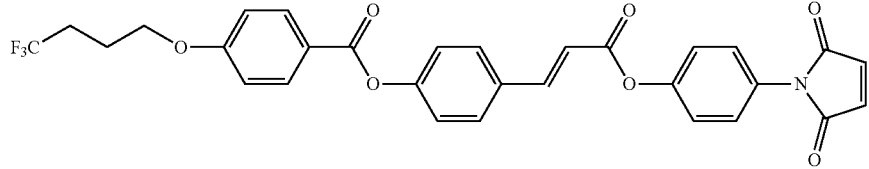

-continued

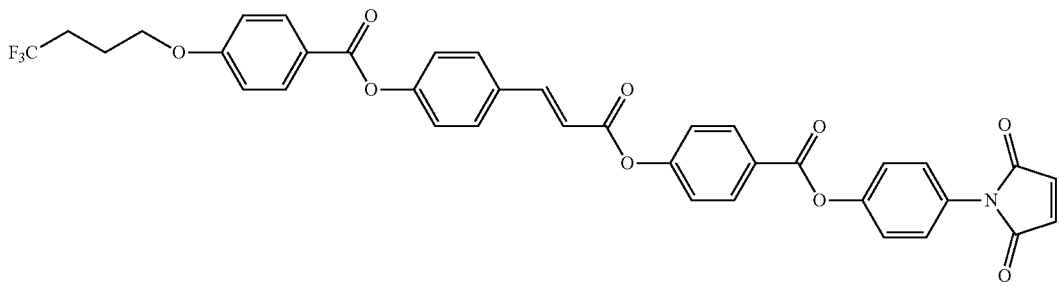

(m3-15)

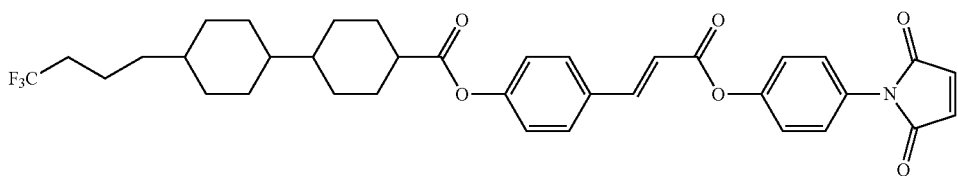

(m3-16)

As the monomer (m3) having a photoalignable group, a monomer having a fluorine atom (m3-f1) and a monomer having no fluorine atom (m3-n1) may be used.

In a case of synthesizing the polymer [P], a proportion of the monomer (m1) having a ring structure A used is preferably 1 to 80 mol %, more preferably 3 to 70 mol %, and most preferably 5 to 60 mol % with respect to a total amount of monomers used for synthesizing the polymer [P].

In addition, a proportion of the monomer (m2) having a reactive functional group used is preferably 1 to 90 mol %, more preferably 5 to 90 mol %, and most preferably 10 to 80 mol % with respect to a total amount of monomers used for synthesizing the polymer [P].

A content proportion of the monomer (m3) having a photoalignable group is preferably 1 to 80 mol %, more preferably 3 to 70 mol %, and most preferably 5 to 60 mol % with respect to a total amount of monomers used for synthesizing the polymer [P].

In the polymerization, a monomer having none of a photoalignable group, an epoxy group and a reactive functional group (hereinafter referred to as "other monomer") may be used together. Examples of the other monomer include a (meth)acrylic compound such as alkyl(meth)acrylate, cycloalkyl(meth)acrylate, benzyl(meth)acrylate, and 2-ethylhexyl(meth)acrylate; an aromatic vinyl compound such as styrene, methyl styrene, and divinylbenzene; a conjugated diene compound such as 1,3-butadiene, and 2-methyl-1,3-butadiene; a maleimide compound such as N-methyl maleimide, N-cyclohexyl maleimide, and N-phenyl maleimide, and maleic acid or its derivative such as maleic acid or maleic anhydride. Here, the other monomer can be used alone or two or more thereof can be used in combination. A proportion of the other monomer used is preferably 50 mol % or less and more preferably 40 mol % or less with respect to a total amount of monomers used for synthesizing the polymer [P].

In the polymerization, a proportion of the compound represented by Formula (2A) used is preferably 5 to 90 mol % with respect to a total amount of monomers used for polymerizing the polymer [P]. When the proportion is less than 5 mol %, it is difficult for the obtained polymer to obtain a sufficient effect of improving solubility with respect to a solvent. On the other hand, when the proportion exceeds 90 mol %, the obtained liquid crystal element tends to have inferior liquid crystal alignment properties and a low voltage holding ratio. A proportion of the compound represented by Formula (2A) used is more preferably 5 to 85 mol % and more preferably 10 to 80 mol % with respect to a total amount of monomers used for polymerizing the polymer [P].

In order to secure sufficient liquid crystal alignment properties and electrical characteristics of the liquid crystal element, a proportion of the styrene monomer and the (meth)acrylic monomer used (a total amount when two or more thereof are used) is preferably 5 to 90 mol % and more preferably 10 to 90 mol % with respect to a total amount of monomers used for polymerizing the polymer [P].

Preferably, the polymerization reaction occurs in an organic solvent in the presence of a polymerization initiator. As the polymerization initiator used, for example, an azo compound such as 2,2'-azobis(isobutyronitrile),2,2'-azobis (2,4-dimethylvaleronitrile), and 2,2'-azobis(4-methoxy-2,4-dimethylvaleronitrile) is preferable. A proportion of the polymerization initiator used is preferably 0.01 to 30 parts by mass with respect to 100 parts by mass of all monomers used for a reaction. Examples of the organic solvent used include an alcohol, ether, ketone, amide, ester, and a hydrocarbon compound.

In the polymerization reaction, a reaction temperature is preferably 30° C. to 120° C., and a reaction time is preferably 1 to 36 hours. An amount (a) of the organic solvent used is preferably set so that a total amount (b) of monomers used for a reaction is 0.1 to 60 mass % with respect to a total amount (a+b) of the reaction solution. Using known isolation methods, for example, a method in which a reaction solution is poured into a large amount of a poor solvent and the obtained precipitate is dried under a reduced pressure and a method in which a reaction solution is distilled off under a reduced pressure in an evaporator, in the reaction solution obtained by dissolving polymers, the polymer [P] contained in the reaction solution may be isolated and then used for preparing a liquid crystal aligning agent.

(Methods 2 to 4)

In Methods 2 to 4, using the compound represented by Formula (m-1), preferably, monomers including one, two or more types of the compound and at least one monomer selected from the group consisting of styrene monomers and (meth)acrylic monomers are polymerized.

A method is preferable in which, according to Methods 2 to 4, in a case of a polymer having a photoalignable group, a ring structure A and a reactive functional group is used as the polymer [P], in order to increase efficiency of introduction of the photoalignable group, the ring structure A, and the reactive functional group, first, a monomer (m1) having a ring structure A, a monomer (m2) having a reactive functional group, and a compound represented by Formula (m-1) are used for polymerization to obtain a polymer having a partial structure represented by Formula (1-C), and in Method 2 and Method 3, maleic anhydride is ring-opened, and then, the obtained polymer (hereinafter referred to as a "precursor [P]") and a compound in which $Y^2$ in Formula (g-1) is a group having a photoalignable group are reacted.

Regarding a polymerization reaction for obtaining the polymer having a partial structure represented by Formula (1-C), description of Method 1 except that the compound represented by Formula (m-1) is used in place of the monomer (m3) having a photoalignable group in Method 1 apply similarly. During polymerization, a proportion of the compound represented by Formula (m-1) used is preferably 1 to 70 mol %, more preferably 3 to 60 mol %, and most preferably 5 to 50 mol % with respect to a total amount of monomers used for synthesizing the polymer [P].

The precursor [P] and the compound represented by Formula (g-1) are preferably reacted in an organic solvent. A proportion of the compound represented by Formula (g-1) used is preferably 1 to 60 mol % and more preferably 3 to 40 mol % with respect to a total amount of the compound represented by Formula (m-1) used.

Examples of the organic solvent used include an alcohol, ether, ketone, amide, ester, and a hydrocarbon compound. In the reaction, a reaction temperature is preferably 30° C. to 120° C. and a reaction time is preferably 1 to 24 hours.

Using known isolation methods, for example, a method in which a reaction solution is poured into a large amount of a poor solvent and the obtained precipitate is dried under a reduced pressure and a method in which a reaction solution is distilled off under a reduced pressure in an evaporator, in the reaction solution obtained by dissolving polymers, the polymer (P) contained in the reaction solution may be isolated and then used for preparing a liquid crystal aligning agent.

Here, although the reason why an effect of improving coating properties, liquid crystal alignment properties and electrical characteristics with respect to a substrate can be enhanced using the liquid crystal aligning agent including the polymer [P] is not clear, one reason is presumed that a relatively large number of polar groups are present around the main chain of the polymer, and thus solubility of the polymer with respect to a solvent is improved, and accordingly, a liquid crystal element having improved coating properties with respect to a substrate and having excellent liquid crystal alignment properties and electrical characteristics is obtained. In particular, it is presumed that, when a carboxyl group and an amino group remain around the main chain of the polymer, a molecular weight between cross-linking points decreases and thus a liquid crystal element having excellent liquid crystal alignment properties and electrical characteristics is obtained. However, this is only a presumption, and does not limit details of the present disclosure.

A weight average molecular weight (Mw) of the polymer (P) in terms of polystyrene standards measured through gel permeation chromatography (GPC) is preferably 1,000 to 300,000 and more preferably 2,000 to 100,000. A molecular weight distribution (Mw/Mn) represented by a ratio of Mw to the number average molecular weight (Mn) in terms of polystyrene standards measured through GPC is preferably 10 or less and more preferably 8 or less. Here, the polymer [P] used for preparing a liquid crystal aligning agent may be used alone or two or more types thereof may be used in combination.

In order to sufficiently improve coating properties with respect to a substrate and obtain favorable liquid crystal alignment properties and a high voltage holding ratio of the liquid crystal element, a content proportion of the polymer [P] in the liquid crystal aligning agent is preferably 0.1 mass % or more, more preferably 0.5 mass % or more, and most preferably 1 mass % or more with respect to all polymers contained in the liquid crystal aligning agent. In addition an upper limit value of the content proportion of the polymer (P) is not particularly limited, and is preferably 90 mass % or less, more preferably 70 mass % or less, and most preferably 50 mass % or less with respect to all polymers contained in the liquid crystal aligning agent.

<Other Components>

The liquid crystal aligning agent of the present disclosure includes the polymer [P] as described above, but it may include components other than the polymer [P] as necessary.

(Polymer [Q])

In order to further improve electrical characteristics and reliability, the liquid crystal aligning agent of the present disclosure preferably further includes a polymer [Q] different from the polymer [P].

Examples of the polymer [Q] include a polyamic acid, a polyimide, a polyamic acid ester, a polyamide, a polyorganosiloxane, and a polymer of monomers having an unsaturated bond. In a case of the polymer [Q] is a polymer having a functional group that reacts with at least one ring structure selected from the group consisting of rings represented by Formula (2) and cyclic carbonates, this is suitable because an interaction between the polymer [P] and the polymer [Q] is improved and liquid crystal alignment properties of the obtained liquid crystal element can be further improved.

Among them, the polymer [Q] is preferably at least one selected from the group consisting of a polyamic acid, a polyamic acid ester, a polyimide, and a polymer of monomers having an unsaturated bond in consideration of improvement in electrical characteristics, affinity with a liquid crystal, mechanical strength, and affinity with the polymer [P], and particularly preferably at least one selected from the group consisting of a polyamic acid, a polyamic acid ester and a polyimide in consideration of an excellent effect of improving the voltage holding ratio.

A proportion of the polymer [Q] added is preferably 100 parts by mass or more, more preferably 100 to 2,000 parts by mass, and most preferably 200 to 1,500 parts by mass with respect to 100 parts by mass of the polymer [P] used for preparing the liquid crystal aligning agent in order for an effect due to the polymer [Q] added and an effect due to the polymer [P] added to be exhibited in a well-balanced manner.

Polyamic Acid, Polyamic Acid Ester, and Polyimide

A polyamic acid, a polyamic acid ester, and a polyimide to be contained in the liquid crystal aligning agent can be synthesized according to a known method in the related art. For example, a polyamic acid can be obtained by reacting a tetracarboxylic acid dianhydride with a diamine. A polyamic acid ester can be obtained by, for example, a method in which the polyamic acid obtained above is reacted with an esterifying agent (for example, methanol, ethanol, and N,N-dimethylformamide diethyl acetal). The polyimide can be obtained by, for example, imidization of the polyamic acid obtained above according to dehydration and ring closure.

Here, an imidization ratio of the polyimide is preferably 20 to 95% and more preferably 30 to 90%. The imidization ratio is expressed as a percentage of a proportion of the number of imide ring structures with respect to a sum of the number of amic acid structures and the number of imide ring structures of the polyimide.

The tetracarboxylic acid dianhydride used for polymerization is not particularly limited, and various tetracarboxylic acid dianhydrides can be used. Specific examples thereof include aliphatic tetracarboxylic acid dianhydrides such as butane tetracarboxylic dianhydride, and ethylene diamine tetraacetic acid dianhydride; alicyclic tetracarboxylic acid dianhydrides such as 1,2,3,4-cyclobutanetetracarboxylic acid dianhydride, 1,3-dimethyl-1,2,3,4-cyclobutanetetracarboxylic acid dianhydride, 2,3,5-tricarboxycyclopentyl acetic acid dianhydride, 5-(2,5-dioxotetrahydrofuran-3-yl)-3a,4,5,9b-tetrahydronaphtho[1,2-c] furan-1,3-dione, 5-(2,5-dioxotetrahydrofuran-3-yl)-8-methyl-3a,4,5,9b-tetrahydronaphtho[1,2-c]furan-1,3-dione, 2,4,6,8-tetracarboxybicyclo[3.3.0] octane-2:4,6:8-dianhydride, cyclopentane tetracarboxylic acid dianhydride, and cyclohexane tetracarboxylic acid dianhydride; and aromatic tetracarboxylic acid dianhydrides such as pyromellitic dianhydride, 4,4'-(hexafluoroisopropylidene)diphthalic anhydride, p-phenylenebis(trimellitic acid monoester anhydride), ethylene glycol bis(anhydrotrimellitate), and 1,3-propylene glycol bis(anhydrotrimellitate), and in addition, tetracarboxylic acid dianhydrides described in Japanese Patent Application Laid-open No. 2010-97188 can be used. Here, the tetracarboxylic acid dianhydride may be used alone or two or more thereof may be used in combination.

In order to improve solubility of the polymer [Q] with respect to a solvent and control phase separation properties for the polymer [P], the tetracarboxylic acid dianhydride used in polymerization preferably includes an alicyclic tetracarboxylic acid dianhydride, and more preferably includes a tetracarboxylic acid dianhydride having a cyclobutane ring, a cyclopentane ring or a cyclohexane ring. A proportion of the alicyclic tetracarboxylic acid dianhydride used is preferably 5 mol % or more, more preferably 10 mol % or more, and most preferably 20 mol % or more with respect to a total amount of the tetracarboxylic acid dianhydride used in polymerization.

In addition, examples of the diamine used in the polymerization include an aliphatic diamine such as ethylene diamine and tetramethylene diamine; an alicyclic diamine such as p-cyclohexane diamine, and 4,4'-methylenebis(cyclohexylamine); a side chain type aromatic diamine such as hexadecanoxydiaminobenzene, colestanyloxy diaminobenzene, cholestanil diaminobenzoate, cholesteryl diaminobenzoate, ranostanil diaminobenzoate, 3,6-bis(4-aminobenzoyloxy)cholestane, 3,6-bis(4-aminophenoxy)cholestane, 1,1-bis(4-((aminophenyl)methyl)phenyl)-4-butylcyclohexane, 2,5-diamino-N,N-diallylaniline, and compounds represented by the following Formula (2-1) to Formula (2-3)

[Chem. 19]

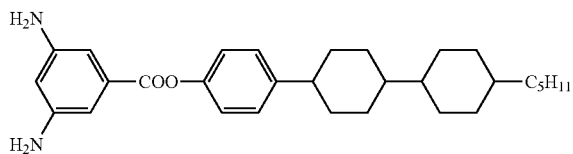
(2-1)

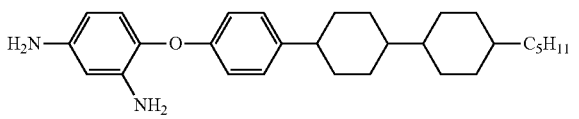
(2-2)

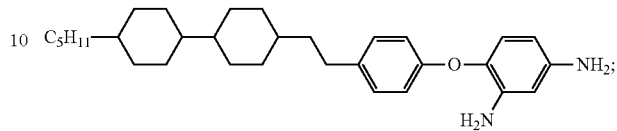
(2-3)

a non-side chain type aromatic diamine such as p-phenylene diamine, 4,4'-diaminodiphenylmethane, 4,4'-diaminodiphenylamine, 4-aminophenyl-4'-aminobenzoate, 4,4'-diamino azobenzene, 3,5-diaminobenzoic acid, 1,5-bis(4-aminophenoxy)pentane, bis[2-(4-aminophenyl)ethyl] hexanedioic acid, bis(4-aminophenyl)amine, N,N-bis(4-aminophenyl) methylamine, N,N'-bis(4-aminophenyl)-benzidine, 2,2'-dimethyl-4,4'-diaminobiphenyl, 2,2'-bis(trifluoromethyl)-4,4'-diaminobiphenyl, 4,4'-diaminodiphenyl ether, 2,2-bis[4-(4-aminophenoxy)phenyl]propane, 4,4'-(phenylenediisopropylidene)bisaniline, 1,4-bis(4-aminophenoxy)benzene, 4-(4-aminophenoxycarbonyl)-1-(4-aminophenyl)piperidine, and 4,4'-[4,4'-propane-1,3-diylbis(piperidine-1,4-diyl)]dianiline; and a diaminoorganosiloxane such as 1,3-bis(3-aminopropyl)-tetramethyldisiloxane, and in addition, diamines described in Japanese Patent Application Laid-open No. 2010-97188 can be used. Here, the diamine may be used alone or two or more thereof may be used in combination.

A weight average molecular weight (Mw) of the polyamic acid, polyamic acid ester, and polyimide to be contained in the liquid crystal aligning agent in terms of polystyrene standards measured through GPC is preferably 1,000 to 500,000 and more preferably 2,000 to 300,000. The molecular weight distribution (Mw/Mn) is preferably 7 or less and more preferably 5 or less. Here, the polyamic acid, polyamic acid ester, and polyimide to be contained in the liquid crystal aligning agent may be used alone or two or more types thereof may be used in combination.

Polymer of Monomers Having an Unsaturated Bond

Examples of the polymer of monomers having an unsaturated bond as the polymer [Q] include a (meth)acrylic polymer, a styrene polymer, and a maleimide polymer. However, the polymer [Q] is different from the polymer [P] in that it does not have at least one of the partial structure represented by Formula (1) and a photoalignable group. The polymer [Q] can be obtained according to the same method as in the polymer [P].

(Solvent)

The liquid crystal aligning agent of the present disclosure is prepared as a composition in a solution form in which a polymer component, and a component which is optionally added as necessary are preferably dissolved in an organic solvent. Examples of the organic solvent include an aprotic polar solvent, a phenol-based solvent, an alcohol, a ketone, an ester, an ether, a halogenated hydrocarbon, and a hydrocarbon. A solvent component may be one thereof or a solvent mixture containing two or more thereof.

Specific examples of the organic solvent used include a highly polar solvent such as N-methyl-2-pyrrolidone, N-ethyl-2-pyrrolidone, 1,2-dimethyl-2-imidazolidinone, γ-butyrolactone, γ-butyrolactam, N,N-dimethylformamide, N,N-dimethylacetamide, ethylene carbonate, and propylene carbonate; 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol-n-propyl ether, ethylene glycol-i-propyl ether, ethylene glycol-n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, diisobutyl ketone, isoamyl propionate, isoamyl isobutyrate, and diisopentyl ether. These can be used alone or two or more thereof can be used in a mixture.

As a solvent component of the liquid crystal aligning agent, generally, a solvent mixture containing a highly polar solvent having improved solubility and leveling properties (for example, N-methyl-2-pyrrolidone, N-ethyl-2-pyrrolidone) and a solvent having favorable wet spreading properties (for example, butyl cellosolve) is used.

On the other hand, in the case of a liquid crystal aligning agent for a plastic base material or low temperature firing, as a solvent component, at least one solvent selected from the group consisting of an ether/alcohol-based solvent, an ester-based solvent, and a ketone-based solvent which have a boiling point of 180° C. or lower at 1 atmosphere (hereinafter referred to as a "specific solvent") can be preferably used.

Specific examples of the specific solvent include, as an ether/alcohol-based solvent, for example, propylene glycol monomethyl ether, diethylene glycol methyl ethyl ether, 3-methoxy-1-butanol, ethylene glycol monomethyl ether, ethylene glycol monoethyl ether, ethylene glycol monopropyl ether, ethylene glycol-n-butyl ether (butyl cellosolve), ethylene glycol dimethyl ether, and diethylene glycol dimethyl ether;

as an ester-based solvent, for example, propylene glycol monomethyl ether acetate, and ethylene glycol ethyl ether acetate; and as a ketone-based solvent, for example, cyclobutanone, cyclopentanone, cyclohexanone, and diisobutyl ketone. Here, the specific solvent may be used alone or two or more thereof may be used in combination.

In a case of a specific solvent is used as the solvent component in the liquid crystal aligning agent, a content proportion of the specific solvent is preferably 20 mass % or more, more preferably 40 mass % or more, most preferably 50 mass % or more, and particularly preferably 80 mass % or more with respect to a total amount of the solvent contained in the liquid crystal aligning agent.

A concentration of a solid content in the liquid crystal aligning agent (a ratio of a total mass of components other than the solvent of the liquid crystal aligning agent to a total mass of the liquid crystal aligning agent) is appropriately selected in consideration of viscosity, volatility, and the like, but it is preferably in a range of 1 to 10 mass %. When a concentration of a solid content is less than 1 mass %, a film thickness of a coating film becomes very small and it is difficult to obtain a favorable liquid crystal alignment film. On the other hand, when a concentration of a solid content exceeds 10 mass %, a film thickness of a coating film becomes very large and it is difficult to obtain a favorable liquid crystal alignment film, and the viscosity of the liquid crystal aligning agent tends to increase and coating properties tend to deteriorate.

In addition to the above, examples of the other components include a low molecular compound having at least one epoxy group in the molecule and having a molecular weight of 1,000 or less (for example, ethylene glycol diglycidyl ether, N,N,N',N'-tetraglycidyl-m-xylene diamine, and N,N,N',N'-tetraglycidyl-4,4'-diaminodiphenylmethane), a functional silane compound, a multifunctional(meth)acrylate, an antioxidant, a metal chelate compound, a curing accelerator, a surfactant, a filler, a dispersant, and a photosensitizer. A proportion of the other components added can be appropriately selected according to compounds as long as effects of the present disclosure are not impaired.

<<Liquid Crystal Alignment Film and Liquid Crystal Element>>

A liquid crystal alignment film of the present disclosure is formed using the liquid crystal aligning agent prepared as above. In addition, a liquid crystal element of the present disclosure includes the liquid crystal alignment film formed using the liquid crystal aligning agent described above. An operation mode of a liquid crystal in the liquid crystal element is not particularly limited, and various modes, for example, a TN type, an STN type, a VA type (including a VA-MVA type and a VA-PVA type), in-plane switching (IPS) type, a fringe field switching (FFS) type, an optically compensated bend (OCB) type, and a polymer sustained alignment (PSA) type) can be applied. The liquid crystal element can be produced by, for example, a method including the following process 1 to process 3. In the process 1, a substrate used varies according to a desired operation mode. Operation modes are the same in the process 2 and the process 3.

<Process 1: Formation of Coating Film>

First, a liquid crystal aligning agent is applied to a substrate, and preferably, a coated surface is heated and thereby a coating film is formed on the substrate. As the substrate, for example, a transparent substrate made of glass such as float glass and soda glass; and a plastic such as polyethylene terephthalate, polybutylene terephthalate, polyether sulfone, polycarbonate, and poly(alicyclic olefin) can be used. As a transparent conductive film provided on one surface of a substrate, a NESA film made of tin oxide ($SnO_2$) (registered trademark commercially available from PPG, UAS), an ITO film made of indium oxide-tin oxide ($In_2O_3$—$SnO_2$), and the like can be used. In a case of a TN type, STN type or VA type liquid crystal element is produced, two substrates on which a patterned transparent conductive film is provided are used. On the other hand, in a case of an IPS type or FFS type liquid crystal element is produced, a substrate on which an electrode patterned in a comb-teeth shape is provided and a counter substrate on which no electrode is provided are used. Application of the liquid crystal aligning agent to the substrate is performed on an electrode formation surface by preferably an offset printing method a spin coating method, a roll coater method or an ink jet printing method.

After the liquid crystal aligning agent is applied, in order to prevent dripping of the applied liquid crystal aligning agent, preliminary heating (pre-baking) is preferably performed. A pre-baking temperature is preferably 30 to 200° C. and a pre-baking time is preferably 0.25 to 10 minutes. Then, the solvent is completely removed and, as necessary, a firing (post-baking) process is performed in order to thermally imidize an amic acid structure in the polymer. A firing temperature (post-baking temperature) in this case is preferably 80 to 250° C. and more preferably 80 to 200° C. A post-baking time is preferably 5 to 200 minutes. In particular, the polymer [P] has favorable solubility with respect to a low boiling point solvent, and is suitable because a liquid crystal element having excellent liquid crystal alignment properties and electrical characteristics can be obtained even if the post-baking temperature is, for example, 200° C. or lower, preferably 180° C. or lower, and more preferably 160° C. or lower. The film thickness of the film formed in this manner is preferably 0.001 to 1 µm.

<Process 2: Alignment Treatment>

In a case of a TN type, STN type, IPS type or FFS type liquid crystal element is produced, a treatment (alignment treatment) in which a liquid crystal alignment ability is imparted to the coating film formed in the process 1 is performed. Therefore, the alignment ability of liquid crystal molecules is imparted to the coating film to form a liquid crystal alignment film. As the alignment treatment, a photoalignment treatment in which light is emitted to the coating film formed on the substrate and thereby a liquid crystal alignment ability is imparted to the coating film is preferable. On the other hand, in a case of a vertically aligned type liquid crystal element is produced, the coating film formed in the process 1 can be directly used as a liquid crystal alignment film. However, in order to further improve the liquid crystal alignment ability, an alignment treatment may be performed on the coating film.

Light emission for photoalignment can be performed by a method in which light is emitted to a coating film after the post-baking process, a method in which light is emitted to a coating film after the pre-baking process and before the post-baking process, a method in which light is emitted to a coating film while the coating film is heated in at least of the pre-baking process and the post-baking process, or the like. As light emitted to the coating film, for example, ultraviolet rays and visible light including light with a wavelength of 150 to 800 nm can be used. Ultraviolet rays including light with a wavelength of 200 to 400 nm are preferable. When emission light is polarized light, it may be linearly polarized light or partially polarized light. When emission light used is linearly polarized light or partially polarized light, light emission may be performed in a direction perpendicular to the surface of the substrate, an oblique direction, or a combination thereof. A light emission direction when non-polarized light is emitted is an oblique direction.

Examples of a light source used include a low pressure mercury lamp, a high pressure mercury lamp, a deuterium lamp, a metal halide lamp, an argon resonance lamp, a xenon lamp, and an excimer laser. A radiation amount of light emitted is preferably 400 to 50,000 J/m$^2$ and more preferably 1,000 to 20,000 J/m$^2$. After light emission for imparting an alignment ability, the surface of the substrate may be subjected to a process of washing using, for example, water, an organic solvent (for example, methanol, isopropyl alcohol, 1-methoxy-2-propanol acetate, butyl cellosolve, and ethyl lactate), or a mixture thereof and a process of heating the substrate.

<Process 3: Construction of Liquid Crystal Cell>

Two substrates on which the liquid crystal alignment film is formed as described above are prepared and a liquid crystal is disposed between the two substrates disposed to face each other to produce a liquid crystal cell. When a liquid crystal cell is produced, for example, a method in which two substrates are disposed to face each other with a gap therebetween so that liquid crystal alignment films face each other, peripheral parts of the two substrates are bonded together using a sealing agent, a liquid crystal is injected and filled into a cell gap surrounded by the surface of the substrate and the sealing agent, and an injection hole is sealed, a method according to an ODF scheme, and the like may be used. As the sealing agent, for example, an epoxy resin containing a curing agent and aluminum oxide spheres as a spacer can be used. Examples of the liquid crystal include a nematic liquid crystal and a smectic liquid crystal. Among them, a nematic liquid crystal is preferable. In a PSA mode, after a liquid crystal cell is constructed, a process of emitting light to the liquid crystal cell is performed while a voltage is applied between conductive films having a pair of substrates.

Next, as necessary, a polarizing plate is bonded to the outer surface of the liquid crystal cell to form a liquid crystal element. Examples of the polarizing plate include a polarizing plate in which a polarizing film called an "H film" in which iodine is absorbed while an polyvinyl alcohol is stretched and aligned is interposed between cellulose acetate protective films and a polarizing plate formed of an H film itself.

The liquid crystal element of the present disclosure can be effectively applied for various applications, and can be applied for, for example, various display devices for a clock, a portable game, a word processor, a laptop computer, a car navigation system, a camcorder, a PDA, a digital camera, a mobile phone, a smartphone, various monitors, a liquid crystal television, and an information display, a light control film, and a retardation film.

EXAMPLES

Examples will be described below in further detail. However, details of the present disclosure are not limited to the following examples.

In the following examples, a weight average molecular weight (Mw)) of a polymer, a number average molecular weight (Mn), and a molecular weight distribution (Mw/Mn) were measured by the following methods.

<Weight Average Molecular Weight, Number Average Molecular Weight, and Molecular Weight Distribution>

According to gel permeation chromatography (GPC), Mw and Mn were measured under the following conditions. In addition, the molecular weight distribution (Mw/Mn) was calculated from the obtained Mw and Mn.

Device: "GPC-101" commercially available from Showa Denko K.K.

GPC column: Combination of "GPC-KF-801," "GPC-KF-802," "GPC-KF-803," and "GPC-KF-804" commercially available from Shimadzu Glc Ltd.

Mobile phase: tetrahydrofuran (THF)

Column temperature: 40° C.

Flow rate: 1.0 mL/min

Sample concentration: 1.0 mass %

Sample injection volume: 100 µL

Detector: differential refractometer

Standard substance: monodisperse polystyrene

Compounds used in the following examples are as follows. Here, in the following description, for convenience of description, a "compound represented by Formula (X)" may be simply referred to as "Compound (X)."

(Photoalignable-Group-Introducing Monomer)
[Chem. 20]
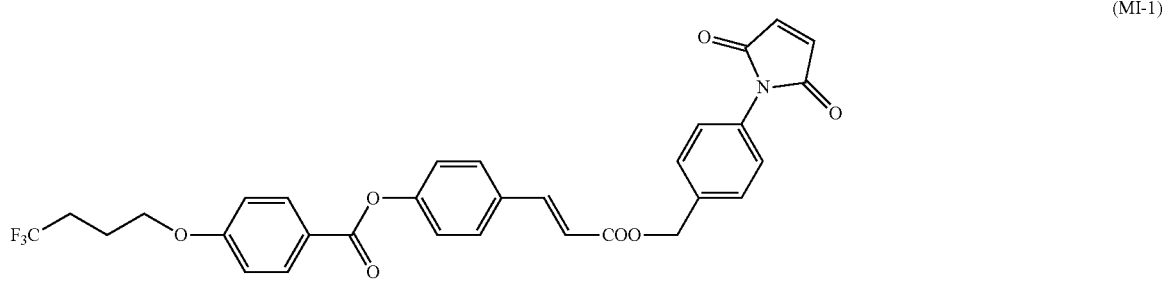
(MI-1)
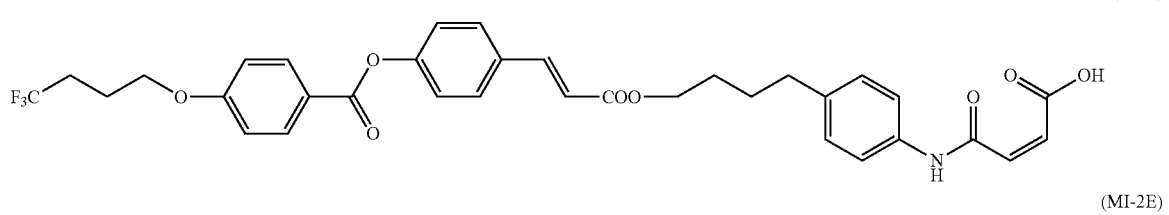
(MI-2)
(MI-2E)
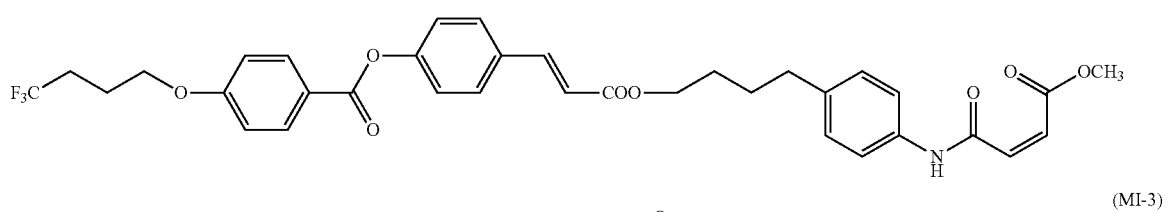
(MI-3)
(MI-3A)
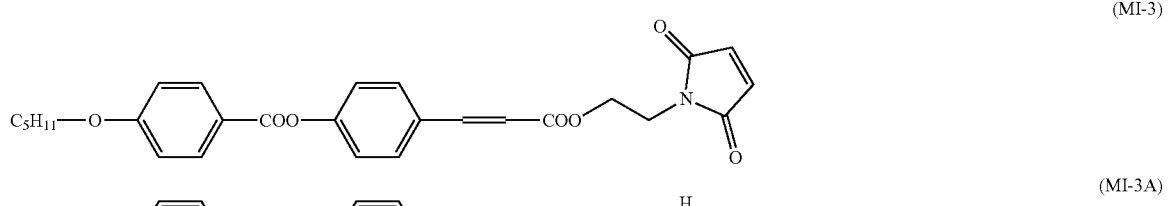
[Chem. 21]
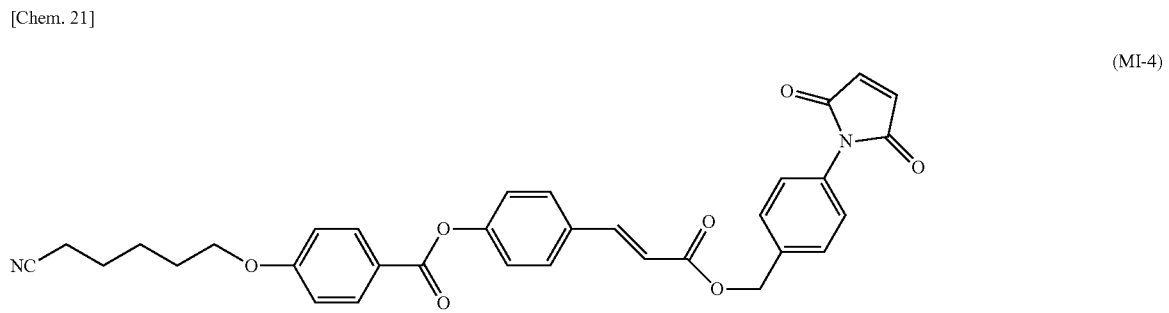
(MI-4)
(MI-5)
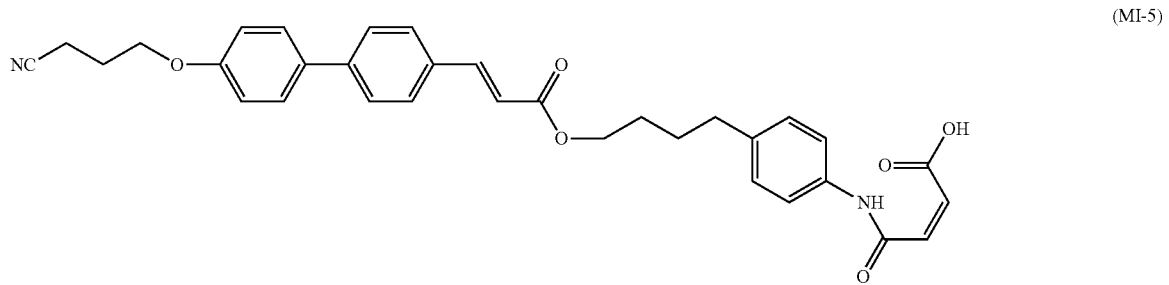

-continued
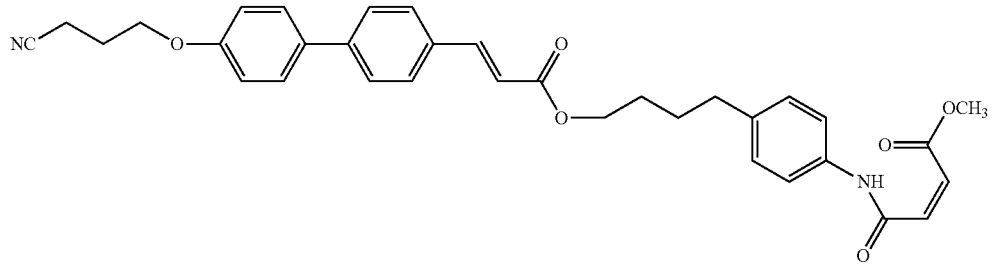
(MI-5E)
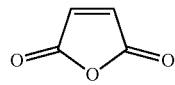
(ML-1)
(Ring-Structure-Containing Monomer)
[Chem. 22]
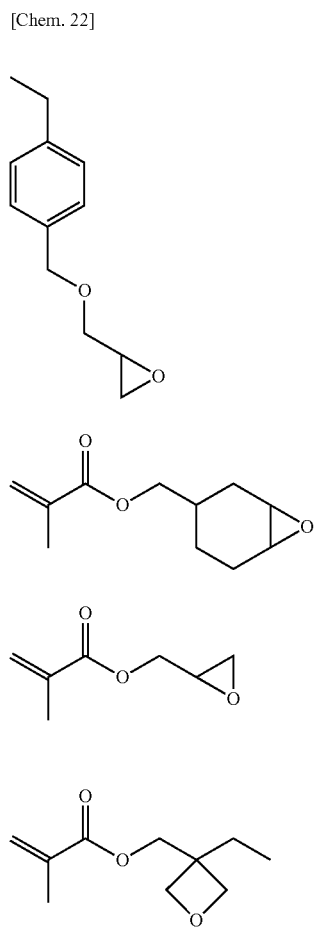
(MA-1)
(MA-2)
(MA-3)
(MA-4)
(MA-5)
(Reactive-Functional-Group-Containing Monomer)
[Chem. 23]
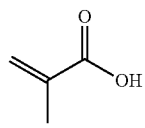
(MB-1)
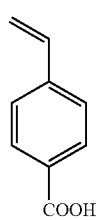
(MB-2)
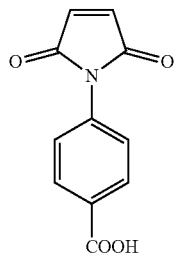
(MB-3)
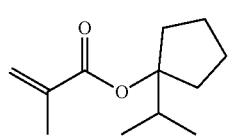
(MB-4)
(Others)
[Chem. 24]
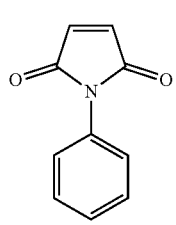
(MD-1)

-continued

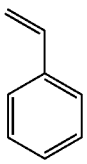

(MD-2)

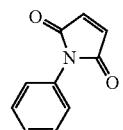

(MI-1)

Synthesis of Monomer

Synthesis Example 1-1

Compound (MI-1) was synthesized according to the following Scheme 1.

[Chem. 25]

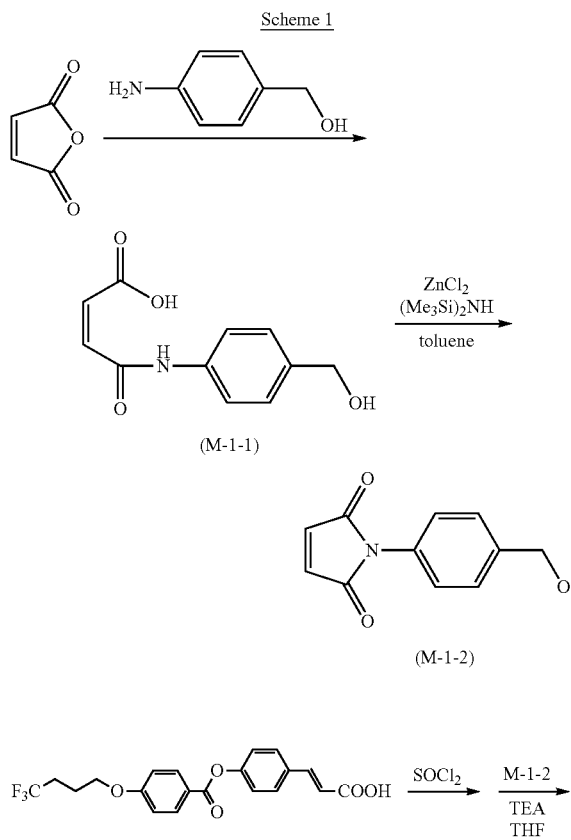

Synthesis of Compound (M-1-1)

12.3 g of (4-aminophenyl)methanol was put into a 2,000 mL 3-necked flask having a stirrer therein and 200 g of tetrahydrofuran was added thereto, and the flask was ice-bathed. A solution containing 9.81 g of succinic anhydride and 200 g of tetrahydrofuran was added dropwise thereto, and the mixture was stirred at room temperature for 3 hours. Then, the precipitated yellow solid was collected through filtration. The yellow solid was vacuum-dried to obtain 21.0 g of Compound (M-1-1).

Synthesis of Compound (M-1-2)

17.7 g of Compound (M-1-1), 10.9 g of zinc chloride (II) and 250 g of toluene were put into a 500 mL 3-necked flask having a stirrer therein, and the mixture was heated and stirred at 80° C. A solution containing 23.2 g of bis(trimethylsilyl)amine and 100 g of toluene was added dropwise thereto and the mixture was stirred at 80° C. for hours. Then, 300 g of ethyl acetate was added to the reaction solution, and washing with 1 mol/L hydrochloric acid was performed twice, washing with an aqueous sodium hydrogen carbonate solution was performed once, and washing with saturated saline was performed once. Then, an organic layer was slowly concentrated using a rotary evaporator so that a content amount became 50 g, and the precipitated white solid was collected through filtration during progress. The white solid was vacuum-dried to obtain 8.13 g of Compound (M-1-2).

Synthesis of Compound (MI-1)

11.8 g of (E)-3-(4-((4-(4,4,4-trifluorobutoxy)benzoyl)oxy)phenyl)acrylic acid, 20 g of thionyl chloride, and 0.01 g of N,N-dimethylformamide were put into a 100 mL eggplant flask having a stirrer therein, and the mixture was stirred at 80° C. for 1 hour. Then, excess thionyl chloride was removed by a diaphragm pump, and 100 g of tetrahydrofuran was added to obtain a solution A.

Newly, 6.09 g of Compound (M-1-2), 200 g of tetrahydrofuran and 12.1 g of trimethylamine were put into a 500 mL3-necked flask having a stirrer therein, and the flask was ice-bathed. The solution A was added dropwise thereto, and the mixture was stirred at room temperature for 3 hours. The reaction solution was re-precipitated in 800 mL of water and the obtained white solid was vacuum-dried to obtain 13.7 g of Compound (MI-1).

Synthesis Example 1-2

Compound (MI-2) was synthesized according to the following Scheme 2.

Scheme 2

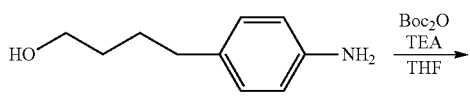

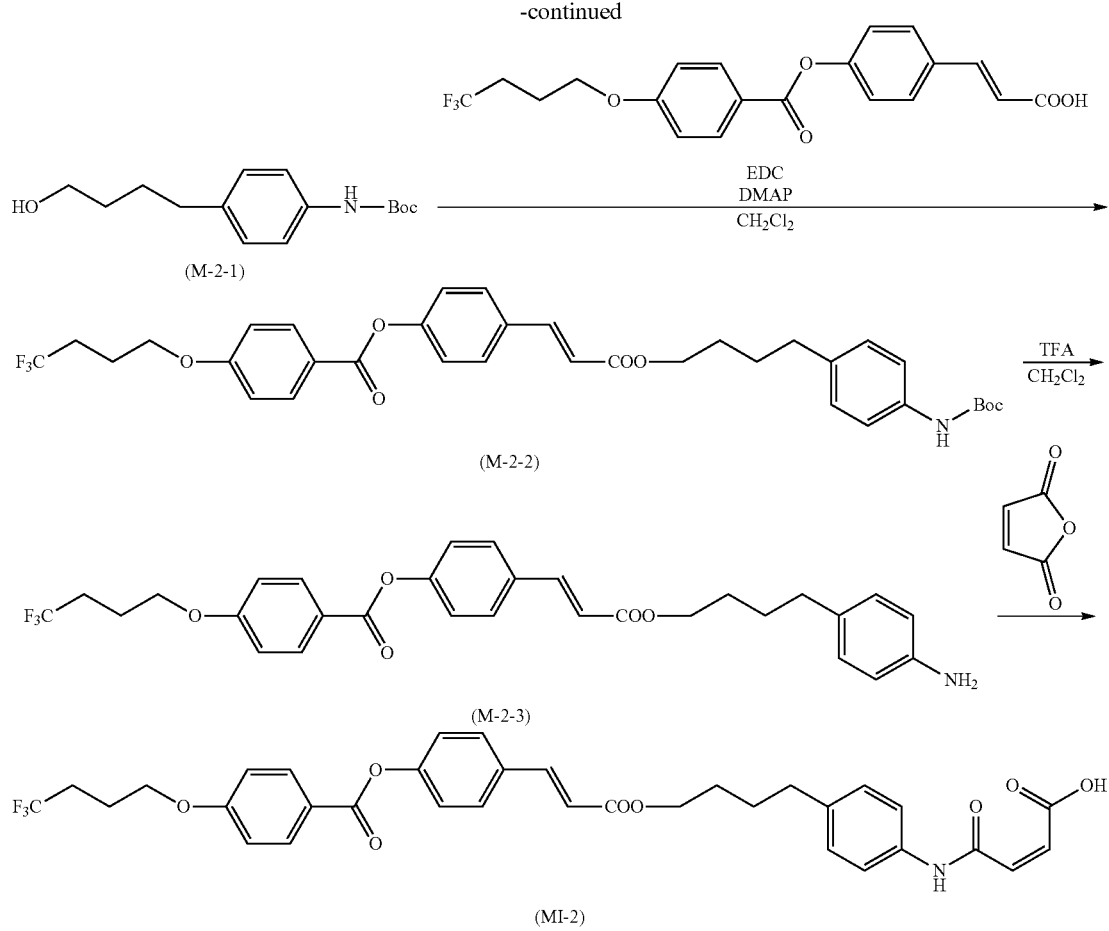

Synthesis of Compound (M-2-1)

16.5 g of 4-(4-aminophenyl)butan-1-ol and 1,000 g of tetrahydrofuran were put into a 2,000 mL 3-necked flask having a stirrer therein, and 15.1 g of trimethylamine was added thereto, and the flask was ice-bathed. A solution containing 24.0 g of t-butyl dicarbonate and 100 g of tetrahydrofuran was added dropwise thereto, and the mixture was stirred at room temperature for 10 hours. Then, 300 g of ethyl acetate was added to the reaction solution and washing with 200 g of distilled water was performed four times. Then, an organic layer was slowly concentrated using a rotary evaporator so that a content amount became 100 g, and the precipitated white solid was collected through filtration during progress. The white solid was vacuum-dried to obtain 25.2 g of Compound (M-2-1).

Synthesis of Compound (M-2-2)

21.2 g of Compound (M-2-1) and 31.5 g of (E)-3-(4-((4-(4,4,4-trifluorobutoxy)benzoyl)oxy)phenyl)acrylic acid were put into a 2,000 mL 3-necked flask having a stirrer therein, and 1,000 g of dichloromethane was added thereto, and the flask was ice-bathed. 1.95 g of N,N-dimethylaminopyridine and 23.0 g of 1-ethyl-3-(3-dimethylaminopropyl)carbodiimide hydrochloride were added thereto in that order, and the mixture was stirred at room temperature for 8 hours, and washing with 500 g of distilled water was then performed four times. Then, an organic layer was slowly concentrated using a rotary evaporator so that a content amount became 100 g, and the precipitated white solid was collected through filtration during progress. The white solid was vacuum-dried to obtain 33.2 g of Compound (M-2-2).

Synthesis of Compound (M-2-3)

27.3 g of Compound (M-2-2) and 28.5 g of trifluoroacetic acid were put into a 300 mL eggplant flask having a stirrer therein, and 50 g of dichloromethane was added thereto, and the mixture was stirred at room temperature for 1 hour. Then, the mixture was neutralized with a saturated aqueous sodium hydrogen carbonate solution and washing with 50 g of distilled water was then performed four times. Then, an organic layer was slowly concentrated using a rotary evaporator so that a content amount became 50 g, and the precipitated white solid was collected through filtration during progress. The white solid was vacuum-dried to obtain 26.5 g of Compound (M-2-3).

Synthesis of Compound (MI-2)

Compound (MI-2) was obtained in the same synthesis manner as in Compound (M-1-1) using Compound (M-2-3) as a starting substance.

Synthesis Example 1-3

Compound (MI-3) was synthesized according to the following Scheme 3.

[Chem. 27]

Scheme 3

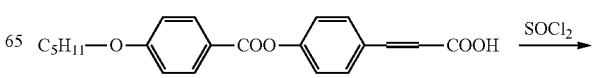

-continued

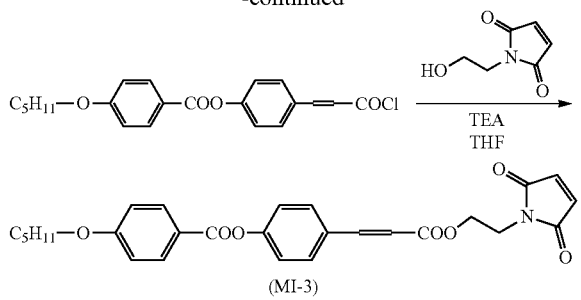

(MI-3)

Synthesis of Compound (MI-3)

A Compound (MI-3) was obtained in the same synthesis manner as in Compound (MI-1) using 3-(4-((4-(pentyloxy)benzoyl)oxy)phenyl)acrylic acid, and 1-(2-hydroxyethyl)-1H-pyrrole-2,5-dione as a starting substance.

Synthesis Example 1-4

A maleic acid amide Compound (MI-3A) having the same side chain structure on a side chain as in Compound (MI-3) was obtained in the same synthesis manner as in Compound (MI-2).

Synthesis of Polymer

Synthesis Example 2-1

Under a nitrogen atmosphere, 5.50 g (8.6 mmol) of Compound (MI-2) obtained in Synthesis Example 1-2, 0.64 g (4.3 mmol) of 4-vinylbenzoic acid, 2.82 g (13.0 mmol) of 4-(2,5-dioxo-3-pyrrolin-1-yl)benzoate and 3.27 g (17.2 mmol) of 4-(glycidyloxymethyl)styrene as a polymerization monomer, 0.31 g (1.3 mmol) of 2,2'-azobis(2,4-dimethylvaleronitrile) as a radical polymerization initiator, 0.52 g (2.2 mmol) of 2,4-diphenyl-4-methyl-1-pentene as a chain transfer agent and 25 ml of tetrahydrofuran as a solvent were put into a 100 mL 2-necked flask, and the mixture was polymerized at 70° C. for 5 hours. The mixture was re-precipitated in n-hexane and the precipitate was then filtrated off, and vacuum drying was performed at room temperature for 8 hours to obtain a desired polymer (P-1). A weight average molecular weight Mw in terms of polystyrene standards measured through GPC was 30,000, and a molecular weight distribution Mw/Mn was 3.

Synthesis Examples 2-2 to 2-9 and Comparative Synthesis Examples 1 to 5

Polymers (P-2) to (P-9) and polymers (R-1) to (R-5) having the same weight average molecular weight and molecular weight distribution as in polymer (P-1) were obtained according to the same polymerization as in Synthesis Example 2-1 except that polymerization monomers were set to have types and molar ratios shown in the following Table 1. Here, the total number of moles of polymerization monomers was 43.1 mmol as in Synthesis Example 2-1. The numerical values in Table 1 indicate amounts of monomers prepared [mol %] with respect to all monomers used for synthesizing polymers.

TABLE 1

| | Name of polymer | Ring-structure-containing monomer | | | | | Reactive-functional-group-containing monomer | | | | Photoalignable-group-introducing monomer | | | | | | | | | Others | |
|---|---|---|---|---|---|---|---|---|---|---|---|---|---|---|---|---|---|---|---|---|---|
| | | MA-1 | MA-2 | MA-3 | MA-4 | MA-5 | MB-1 | MB-2 | MB-3 | MB-4 | MI-1 | MI-2 | MI-2E | MI-3 | MI-3A | MI-4 | MI-5 | ML-1 | M-2-3 | MD-1 | MD-2 |
| Synthesis Example 2-1 | P-1 | 40 | — | — | — | — | — | 10 | 30 | — | — | 20 | — | — | — | — | — | — | — | — | — |
| Synthesis Example 2-2 | P-2 | 40 | 20 | — | — | — | — | 10 | 30 | — | 10 | 10 | — | — | — | — | — | — | — | — | — |
| Synthesis Example 2-3 | P-3 | 20 | — | — | — | — | — | 10 | 10 | — | — | 60 | — | — | — | — | — | — | — | — | — |
| Synthesis Example 2-4 | P-4 | 40 | — | — | — | — | — | 10 | 30 | — | — | — | 20 | — | — | — | — | — | — | — | — |
| Synthesis Example 2-5 | P-5 | 40 | — | — | — | — | — | 10 | 30 | — | — | — | — | — | 20 | — | — | — | — | — | — |
| Synthesis Example 2-6 | P-6 | 40 | — | — | — | — | — | 10 | 30 | — | — | — | — | — | — | — | 20 | — | — | — | — |
| Synthesis Example 2-7 | P-7 | — | — | 20 | 20 | — | 20 | 20 | — | — | — | 20 | — | — | — | — | — | — | — | — | — |
| Synthesis Example 2-8 | P-8 | — | — | 20 | — | — | — | — | 20 | 20 | — | 20 | 20 | — | — | — | — | — | — | — | — |
| Synthesis Example 2-9 | P-9 | — | — | — | — | 40 | — | — | — | — | 60 | — | — | — | — | — | — | — | — | — | — |
| Synthesis Example 2-10 | P-10 | — | — | — | 20 | — | — | 25 | — | — | — | — | — | — | — | — | — | 30 | (20)*¹ | — | 25 |
| Comparative Synthesis Example 1 | R-1 | 40 | — | — | — | — | — | 10 | 30 | — | 20 | — | — | — | — | — | — | — | — | — | — |
| Comparative Synthesis Example 2 | R-2 | 20 | — | — | — | — | — | 10 | 10 | — | 60 | — | — | — | — | — | — | — | — | — | — |
| Comparative Synthesis Example 3 | R-3 | 40 | — | — | — | — | — | 10 | 30 | — | — | — | — | 20 | — | — | — | — | — | — | — |
| Comparative Synthesis Example 4 | R-4 | 40 | — | — | — | — | — | 10 | 30 | — | — | — | — | — | — | 20 | — | — | — | — | — |
| Comparative Synthesis Example 5 | R-5 | 40 | — | — | — | — | — | 10 | 30 | — | — | — | — | — | — | — | — | — | — | 20 | — |

*¹Anhydride skeleton in main chain is modified by Compound (M-2-3)

Synthesis Example 2-10

An anhydride-group-containing polymer having the same weight average molecular weight and molecular weight distribution as in the polymer (P-1) was obtained according to the same polymerization as in Synthesis Example 2-1 except that polymerization monomers were set to have types and molar ratios shown in Table 1. 20 mol % of a photoalignable-group-containing monoamine represented by the following Formula (M-2-3) with respect to a total amount of monomers prepared was additionally added to the obtained polymer, and thereby a desired polymer (P-10) was obtained.

[Chem. 28]

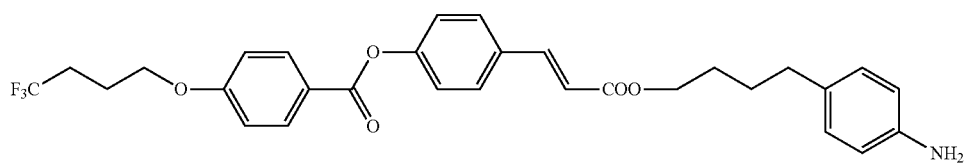

(M-2-3)

Synthesis Example 2-11

13.8 g (70.0 mmol) of 1,2,3,4-cyclobutanetetracarboxylic acid dianhydride as a tetracarboxylic acid dianhydride, and 16.3 g (76.9 mmol) of 2,2'-dimethyl-4,4'-diaminobiphenyl as a diamine were dissolved in 170 g of NMP, and reacted at 25° C. for 3 hours to obtain a solution containing 10 mass % of a polyamic acid. Next, the polyamic acid solution was poured into an excessively large amount of methanol, and the reaction product was precipitated. The precipitate was washed with methanol and dried at 40° C. for 15 hours under a reduced pressure to obtain a polyamic acid (PAA).

Production and Evaluation of Optically Vertical Type Liquid Crystal Display Element

Example 1

1. Preparation of Liquid Crystal Aligning Agent (AL-1)

NMP and butyl cellosolve (BC) as a solvent were added to 100 parts by mass of the polymer (P-1) obtained in Synthesis Example 2-1 as the polymer [P] to obtain a solution with a solvent composition of NMP/BC=50/50 (mass ratio) and a solid content concentration of 4.0 mass %. The solution was filtered through a filter with a pore size of 1 m to prepare a liquid crystal aligning agent (AL-1).

2. Evaluation of Coating Properties

The liquid crystal aligning agent (AL-1) prepared above was applied to a glass substrate using a spinner and pre-baked on a hot plate at 80° C. for 1 minute, and then heated (post-baked) in an oven of which the inside was purged with nitrogen at 230° C. for 30 minutes, and thereby a coating film with an average film thickness of 0.1 μm was formed. The coating film was observed under a microscope with a magnification of 100 and 10, and it was checked whether the film thickness was irregular and there were pinholes. Neither the irregular film thickness nor the occurrence of pinholes was observed even when observed with a microscope with a magnification of 100, it was evaluated as "good (A)." At least one of the irregular film thickness and the occurrence of pinholes was observed with a microscope with a magnification of 100, but neither the irregular film thickness nor the occurrence of pinholes was observed with a microscope with a magnification of 10, it was evaluated as "acceptable (B)." At least one of the irregular film thickness and the occurrence of pinholes was clearly observed with a microscope with a magnification of 10, it was evaluated as "poor (C)." In this example, neither the irregular film thickness nor the occurrence of pinholes was observed with a microscope with a magnification of 100, and coating properties were evaluated as "good (A)."

In order to evaluate coating properties in further detail, coating properties were evaluated at an edge part (the outer edge part of the formed coating film). The liquid crystal aligning agent (AL-1) prepared above was applied to a surface of a transparent electrode on a glass substrate to which the transparent electrode made of an ITO film was attached using a printer for coating a liquid crystal alignment film and dried in the same manner as above. The shape and the flatness of the edge part were observed. When the linearity was high and the surface was flat, it was evaluated as "good (A)." When the linearity was high but there were irregularities, it was evaluated as "acceptable (B)." When there were irregularities and there was liquid return from the edge (linearity was low), it was evaluated as "poor (C)." In the result of this example, coating properties were determined as "good (A)."

In addition, using a stylus type film thickness gauge, the film thickness was measured at four points in the plane of the coating film. The film thickness uniformity was evaluated according to a variation (a difference from an average film thickness δ (δ=0.1 μm) in the measured values. When measured values at four points are in a range of ±25 with respect to the average film thickness δ and a uniform film thickness was obtained, it was evaluated as "good (A)." When there was a measured value outside the range of +25 with respect to the average film thickness δ, but all of the measured values at four points were in a range of ±50 with respect to the average film thickness δ, it was evaluated as "acceptable (B)." When there was a measured value outside the range of ±50 with respect to the average film thickness δ and there was a large variation in the measured values, it was evaluated as "poor (C)." In the result of this example, the film thickness uniformity was evaluated as "good (A)."

3. Production of Optically Vertical Type Liquid Crystal Display Element

The liquid crystal aligning agent (AL-1) prepared above was applied to a surface of a transparent electrode on a glass substrate to which the transparent electrode made of an ITO film was attached using a spinner and pre-baked on a hot plate at 80° C. for 1 minute. Then, heating was performed in an oven of which the inside was purged with nitrogen at 230° C. for 1 hour to form a coating film with a film thickness of 0.1 μm. Next, polarized ultraviolet rays of 1,000 J/m² including a bright line of 313 nm were emitted to the surface of the coating film in a direction tilted at 400 from the normal line of the substrate using a Hg—Xe lamp and Gran-Taylor prism to impart a liquid crystal alignment ability. The same operations were repeated to prepare a pair of substrates (two substrates) having a liquid crystal alignment film.

An epoxy resin adhesive containing aluminum oxide spheres with a diameter of 3.5 μm was applied to the outer circumference of a surface having one liquid crystal alignment film between the substrates by screen printing. Then, liquid crystal alignment film surfaces of the pair of substrates were made to face each other and press-bonded so that directions of ultraviolet rays projected to the surfaces of the substrates along optical axes of the substrates were antiparallel, and the adhesive was thermally cured at 150° C. for 1 hour. Next, a negative type liquid crystal (MLC-6608 commercially available from Merch Group) was filled into gaps between the substrates through a liquid crystal inlet and the liquid crystal inlet was then sealed with an epoxy adhesive. In addition, in order to remove fluid flow alignment when a liquid crystal was injected, slow cooling was performed to room temperature while heating was performed at 130° C. Next, polarizing plates were bonded to both outer surfaces of the substrates so that polarization directions thereof were orthogonal to each other and formed an angle of 45° with respect to directions of ultraviolet rays projected to the surfaces of the substrates along optical axes in the liquid crystal alignment film, and thereby a liquid crystal display element was produced.

4. Evaluation of Liquid Crystal Alignment Properties

It was observed whether there was an abnormal domain in the change in the brightness under an optical microscope when a voltage of 5 V was turned ON and OFF (applied and released) for the liquid crystal display element produced above. The liquid crystal alignment properties were evaluated as "good (A)" when there was no abnormal domain, evaluated as "acceptable (B)" when there was an abnormal domain partially, and evaluated as "poor (C)" when there was an abnormal domain generally. In the result of this example, the liquid crystal alignment properties were "good (A)."

5. Evaluation of Voltage Holding Ratio (VHR)

A voltage of 5 V with an application time of 60 microseconds and a span of 167 milliseconds was applied to the liquid crystal display element produced above and a voltage holding ratio 167 milliseconds after application release was then measured. VHR-1 (commercially available from Toyo Corporation) was used as a measurement device. In this case, when the voltage holding ratio was 95% or more, it was evaluated as "very good (A)," when the voltage holding ratio was 80% or more and less than 95%, it was evaluated as "good (B)," when the voltage holding ratio was 50% or more and less than 80%, it was evaluated as "acceptable (C)," and when the voltage holding ratio was less than 50%, it was evaluated as "poor (D)." As a result of this example, the voltage holding ratio was evaluated as "good (B)."

6. Evaluation of Placing Resistance

The liquid crystal aligning agent (AL-1) prepared above was applied to a surface of a transparent electrode on a glass substrate to which the transparent electrode made of an ITO film was attached using a spinner and pre-baked on a hot plate at 80° C. for 1 minute. Then, heating was performed in an oven of which the inside was purged with nitrogen at 230° C. for 1 hour to form a coating film with a film thickness of 0.1 μm. Next, polarized ultraviolet rays of 1,000 J/m$^2$ including a bright line of 313 nm were emitted to the surface of the coating film in a direction tilted at 400 from the normal line of the substrate using a Hg—Xe lamp and Gran-Taylor prism to obtain a liquid crystal alignment film. The same operations were repeated to prepare two pairs of substrates (a total of four substrates) having a liquid crystal alignment film.

A pair of substrates (2 substrates) among the substrates prepared above and a Petri dish containing NMP were put into a stainless steel vat (about 20 cm×30 cm), the stainless steel vat including the substrates and the Petri dish therein was covered with an aluminum foil and left at 25° C. for 2 hours and the substrates were then taken out. Then, a liquid crystal display element (this is referred to as an "element A") was produced using the removed pair of substrates according to the same method as in "3. Production of optically vertical type liquid crystal display element."

In addition, regarding the other pair of substrates, a liquid crystal display element (this is referred to as an "element B") was produced in the same operation as above except that a process of a Petri dish containing NMP and substrates being left in a stainless steel vat was not performed.

Next, pretilt angles of two liquid crystal display elements were measured according to a crystal rotation method using a He—Ne laser beam according to the method described in Non-Patent Literature (T. J. Scheffer et. al. J. Appl. Phys. Vo. 19. p 2013 (1980)), and a tilt difference δθ was obtained according to the following Equation (2).

$$\delta\theta=((\theta 1-\theta 2)/\theta 1)\times 100 \quad (2)$$

(In Equation (2), θ1 is a pretilt angle of the element B, and θ2 is a pretilt angle of the element A)

When δθ was 5% or less, it was evaluated as "good (A)," when δθ was 5% or more or less than 10%, it was evaluated as "acceptable (B)," and when δθ was 10% or more, it was evaluated as "poor (C)." In the result of this example, the placing resistance was evaluated as "good (A)."

Examples 2 to 6, and 9 to 12, and Comparative Examples 1, 2, and 5

Liquid crystal aligning agents were prepared with the same solid content concentration as in Example 1 except that the mixing composition was changed as shown in the following Table 2. In addition, using the liquid crystal aligning agents, coating properties of the liquid crystal aligning agents were evaluated in the same manner as in Example 1, and optically vertical type liquid crystal display elements were produced in the same manner as in Example 1, and various evaluations were performed. The results are shown in the following Table 4. Here, in the following Table 4, the result of observation of the irregular film thickness and pinholes is shown in the column "coating properties," the result of observation of the edge part is shown in the column "edge shape," and the evaluation result based on the variation in the film thickness is shown in the column "film thickness uniformity." In Comparative Example 2, since solubility of the polymer was low, and a liquid crystal aligning agent with a desired solvent composition was not prepared, its evaluation has failed. Therefore, it is shown as "x" in Table 4.

Examples 13 to 15, and Comparative Example 6

Liquid crystal aligning agents were prepared with the same solid content concentration (4.0 mass %) as in Example 1 except that types and amounts of polymers to be added to liquid crystal aligning agents were changed as shown in the following Table 3 and the solvent composition was changed as shown in the following Table 3. In addition, using the liquid crystal aligning agents, coating properties of the liquid crystal aligning agents were evaluated in the same manner as in Example 1, and optically vertical type liquid crystal display elements were produced in the same manner as in Example 1, and various evaluations were performed. These results are shown in the following Table 4. Here, in Comparative Example 6, since solubility of the polymer was low, a liquid crystal aligning agent with a desired solvent composition was not prepared, its evaluation has failed. Therefore, it is shown as "x" in Table 4.

Production and Evaluation of PSA Type Liquid Crystal Display Element

Example 7

1. Preparation of Liquid Crystal Aligning Agent (AL-7)

A liquid crystal aligning agent (AL-7) was prepared with the same solvent composition and solid content concentration as in Example 1 except that 100 parts by mass of the polymer (P-5) obtained in Synthesis Example 2-5 and 1,000 parts by mass of the polymer (PAA) obtained in Synthesis Example 2-11 were used as polymers.

2. Evaluation of Coating Properties

Coating properties were evaluated in the same manner as in Example 1 except that (AL-7) was used in place of (AL-1) as the liquid crystal aligning agent. In the result of this example, the coating properties were evaluated as "B." In addition, the edge shape was evaluated as "A" and the film thickness uniformity was evaluated as "B."

3. Preparation of Liquid Crystal Composition 5 mass % of a liquid crystalline compound represented by the following Formula (L-1) and 0.3 mass % of a photopolymerizable compound represented by the following Formula (L2-1) were added to and mixed with 10 g of a nematic liquid crystal (MLC-6608 commercially available from Merch Group) to obtain a liquid crystal composition LC1.

(two substrates) having a liquid crystal alignment film were obtained. Here, the pattern of the electrode used was the same pattern as in the electrode pattern in the PSA mode.

Next, an epoxy resin adhesive containing aluminum oxide spheres with a diameter of 5.5 μm was applied to the outer edge of a surface having a liquid crystal alignment film of one substrate between the pair of substrates, and liquid crystal alignment film surfaces were then superimposed to face each other and press-bonded, and the adhesive was cured. Next, the liquid crystal composition LC1 prepared above was filled between the pair of substrates through a liquid crystal inlet and the liquid crystal inlet was then sealed with an acrylic light curing adhesive, and thereby a liquid crystal cell was produced. Then, an alternating current with 10 V and a frequency of 60 Hz was applied between conductive films of the liquid crystal cell, and while the liquid crystal was driven, ultraviolet rays with a radiation amount of 100,000 J/m$^2$ were emitted using an ultraviolet ray emitting device in which a metal halide lamp was used as a light source. Here, the radiation amount was a value measured using a light meter measured based on a wavelength of 365 nm. Then, polarizing plates were bonded to both outer surfaces of the substrates so that polarization directions thereof were orthogonal to each other and formed an angle of 45° with respect to directions of ultraviolet rays projected to the surfaces of the substrates along optical axes in the liquid crystal alignment film, and thereby a liquid crystal display element was produced.

5. Evaluation of Liquid Crystal Alignment Properties

The liquid crystal alignment properties of the PSA type liquid crystal display element produced above were evaluated in the same manner as in Example 1. In the result of this example, the liquid crystal alignment properties were "A."

6. Evaluation of Voltage Holding Ratio (VHR)

The voltage holding ratio of the PSA type liquid crystal display element produced above was evaluated in the same

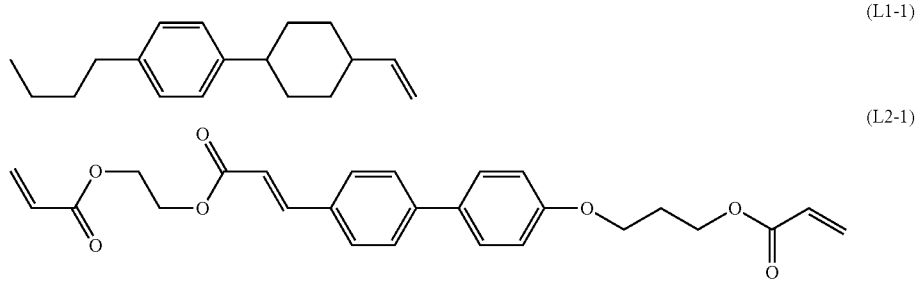

(L1-1)

(L2-1)

4. Production of PSA Type Liquid Crystal Display Element

The liquid crystal aligning agent (AL-7) prepared above was applied to the surfaces of electrodes of two glass substrates each having a conductive film made of an ITO electrode using a liquid crystal alignment film printer (commercially available from Nissha Co., Ltd.), and heated (pre-baked) on a hot plate at 80° C. for 2 minutes to remove the solvent, and heating (post-baking) was then performed on a hot plate at 150° C. for 10 minutes, and thereby a coating film with an average film thickness of 0.06 μm was formed. The coating film was ultrasonically washed with ultrapure water for 1 minute, and then dried in a clean oven at 100° C. for 10 minutes, and thereby a pair of substrates manner as in Example 1. In the result of this example, the voltage holding ratio was evaluated as "A."

7. Evaluation of Placing Resistance

Placing resistance of the PSA type liquid crystal display element produced above was evaluated in the same manner as in Example 1. In the result of this example, the placing resistance was evaluated as "A."

Comparative Example 3

A liquid crystal aligning agent (BL-3) was prepared with the same solid content concentration as in Example 1 except that the mixing composition was changed as shown in the following Table 2. In addition, using the liquid crystal aligning agent (BL-3), coating properties of the liquid crystal aligning agent were evaluated in the same manner as in Example 1, and a PSA type liquid crystal display element was produced in the same manner as in Example 7, and various evaluations were performed in the same manner as in Example 1. The evaluation results are shown in the following Table 4.

Production and Evaluation of Optically Horizontal Type Liquid Crystal Display Element Example 8

1. Preparation of Liquid Crystal Aligning Agent (AL-8)

A liquid crystal aligning agent (AL-8) was prepared with the same solvent composition and solid content concentration as in Example 1 except that 100 parts by mass of the polymer (P-6) obtained in Synthesis Example 2-6 and 1,000 parts by mass of the polymer (PAA) obtained in Synthesis Example 2-11 were used as polymers.

2. Evaluation of Coating Properties

Coating properties were evaluated in the same manner as in Example 1 except that (AL-8) was used in place of (AL-1) as the liquid crystal aligning agent. In the result of this example, the coating properties were evaluated as "B." In addition, the edge shape was evaluated as "A" and the film thickness uniformity was evaluated as "B."

3. Production of Optically Horizontal Type Liquid Crystal Display Element

The liquid crystal aligning agent (AL-8) prepared above was applied to a surface of a transparent electrode on a glass substrate to which the transparent electrode made of an ITO film was attached using a spinner and pre-baked on a hot plate at 80° C. for 1 minute. Then, heating was performed in an oven of which the inside was purged with nitrogen at 230° C. for 1 hour to form a coating film with a film thickness of 0.1 ptm. Next, polarized ultraviolet rays of 1,000 J/m$^2$ including a bright line of 313 nm were emitted to the surface of the coating film in a direction tilted at 900 from the normal line of the substrate using a Hg—Xe lamp and Gran-Taylor prism, and after polarized ultraviolet rays were emitted, a heating treatment was performed on a hot plate at 150° C. for 10 minutes. Such a series of operations were repeated to prepare a pair of substrates (two substrates) having a liquid crystal alignment film.

An epoxy resin adhesive containing aluminum oxide spheres with a diameter of 3.5 μm was applied to the outer circumference of a surface having one liquid crystal alignment film among the substrates by screen printing. Then, liquid crystal alignment film surfaces of the pair of substrates were made to face each other and press-bonded so that directions of ultraviolet rays projected to the surfaces of the substrates along optical axes of the substrates were horizontal, and the adhesive was thermally cured at 150° C. for 1 hour. Next, a positive type liquid crystal (MLC-7028-100 commercially available from Merch Group) was filled into gaps between the substrates through a liquid crystal inlet and the liquid crystal inlet was then sealed with an epoxy adhesive. In addition, in order to remove fluid flow alignment when a liquid crystal was injected, slow cooling was performed to room temperature while heating was performed at 130° C. Next, polarizing plates were bonded to both outer surfaces of the substrates so that polarization directions thereof were orthogonal to each other and formed an angle of 90° with respect to directions of ultraviolet rays projected to the surfaces of the substrates along optical axes in the liquid crystal alignment film, and thereby a liquid crystal display element was produced.

4. Evaluation of Liquid Crystal Alignment Properties

The liquid crystal alignment properties of the optically horizontal type liquid crystal display element produced above were evaluated in the same manner as in Example 1. In the result of this example, the liquid crystal alignment properties were "A."

5. Evaluation of Voltage Holding Ratio (VHR)

The voltage holding ratio of the optically horizontal type liquid crystal display element produced above was evaluated in the same manner as in Example 1. In the result of this example, the voltage holding ratio was evaluated as "A."

6. Evaluation of Placing Resistance

Placing resistance of the optically horizontal type liquid crystal display element produced above was evaluated in the same manner as in Example 1. In the result of this example, the placing resistance was evaluated as "A."

Comparative Example 4

A liquid crystal aligning agent (BL-4) was prepared with the same solid content concentration as in Example 1 except that the mixing composition was changed as shown in the following Table 2. In addition, using the liquid crystal aligning agent (BL-4), coating properties of the liquid crystal aligning agent were evaluated in the same manner as in Example 1, and an optically horizontal type liquid crystal display element was produced in the same manner as in Example 8, and various evaluations were performed in the same manner as in Example 1. The evaluation results are shown in the following Table 4.

TABLE 2

| Liquid crystal aligning agent | Polymer (P) | | Other polymer 1 | | Other polymer 2 | |
|---|---|---|---|---|---|---|
| | Type | Parts by mass | Type | Parts by mass | Type | Parts by mass |
| Example 1 | AL-1 | P-1 | 100 | — | — | — | — |
| Example 2 | AL-2 | P-1 | 100 | — | — | PAA | 500 |
| Example 3 | AL-3 | P-1 | 100 | — | — | PAA | 1,000 |
| Example 4 | AL-4 | P-2 | 100 | — | — | PAA | 1,000 |
| Example 5 | AL-5 | P-3 | 100 | — | — | PAA | 1,000 |
| Example 6 | AL-6 | P-4 | 100 | — | — | PAA | 1,000 |
| Example 7 | AL-7 | P-5 | 100 | — | — | PAA | 1,000 |
| Example 8 | AL-8 | P-6 | 100 | — | — | PAA | 1,000 |
| Example 9 | AL-9 | P-7 | 100 | — | — | PAA | 1,000 |
| Example 10 | AL-10 | P-8 | 100 | — | — | PAA | 1,000 |
| Example 11 | AL-11 | P-9 | 100 | — | — | PAA | 500 |
| Example 12 | AL-12 | P-10 | 100 | — | — | PAA | 500 |
| Comparative Example 1 | BL-1 | — | — | R-1 | 100 | — | — |
| Comparative Example 2 | BL-2 | — | — | R-2 | 100 | — | — |
| Comparative Example 3 | BL-3 | — | — | R-3 | 100 | — | — |
| Comparative Example 4 | BL-4 | — | — | R-4 | 100 | — | — |
| Comparative Example 5 | BL-5 | — | — | R-5 | 100 | PAA | 500 |

In Table 2, the numerical values in the column of polymers indicate a proportion (parts by mass) of the polymer (PAA) added with respect to 100 parts by mass of the polymer [P] used for preparing the liquid crystal aligning agent in Examples 2 to 12, and indicate a proportion (parts by mass) of the polymer (PAA) added with respect to 100 parts by mass of the polymer (R-5) used for preparing the liquid crystal aligning agent in Comparative Example 5. The solid content concentration of the liquid crystal aligning agent was the same (4.0 mass %) in all of the examples. "-" means that the polymer in the corresponding column was not used.

TABLE 3

| | Liquid crystal aligning agent | Polymer (P) | | Other polymer | | Solvent 1 | | Solvent 2 | |
|---|---|---|---|---|---|---|---|---|---|
| | | Type | Parts by mass | Type | Parts by mass | Type | Parts by mass | Type | Parts by mass |
| Example 13 | AL-14 | P-1 | 100 | — | — | CHN | 50 | BC | 50 |
| Example 14 | AL-15 | P-1 | 100 | — | — | PGMEA | 50 | BC | 50 |
| Example 15 | AL-16 | P-1 | 100 | — | — | EDM | 50 | PGME | 50 |
| Comparative Example 6 | BL-6 | — | — | R-1 | 100 | CHN | 50 | BC | 50 |

In Table 3, the solid content concentration of the liquid crystal aligning agent was the same (4.0 mass %). "-" means that the polymer in the corresponding column was not used. The numerical values of Solvent 1 and Solvent 2 indicate a proportion of each compound used (mass %) with respect to a total amount of the solvent used for preparing the liquid crystal aligning agent.

Abbreviations of the solvents have the following meanings.
PGME: propylene glycol monomethyl ether
PGMEA: propylene glycol monomethyl ether acetate
EDM: diethylene glycol methyl ethyl ether
CHN: cyclohexanone
BC: butyl cellosolve liquid crystal display element exhibited favorable results. In addition, the placing resistance was evaluated as "A."

In addition, it can be understood that, in Examples 13 to 15 in which the low boiling point solvents CHN, PGMEA, PGME, EDM, and BC were used as a solvent, coating properties (the irregular film thickness and the occurrence of pinholes, the edge shape, and film thickness uniformity) were evaluated as "A," and liquid crystal alignment properties were evaluated as "A," the voltage holding ratio was evaluated as "B," and the placing resistance was evaluated as "A," and excellent characteristics were exhibited even if a low boiling point solvent was used.

On the other hand, in Comparative Example 1 in which a polymer in which a maleimide-ring-containing compound was used as a monomer was contained in place of the polymer [P] as a polymer component, while coating properties evaluated based on the irregular film thickness and the occurrence of pinholes were evaluated as "C," the edge

TABLE 4

| | Evaluation process | Coating properties | Edge shape | Film thickness uniformity | Liquid crystal alignment properties | VHR | Placing resistance |
|---|---|---|---|---|---|---|---|
| Example 1 | Optically vertical type | A | A | A | A | B | A |
| Example 2 | Optically vertical type | A | A | A | A | A | A |
| Example 3 | Optically vertical type | A | A | A | A | A | A |
| Example 4 | Optically vertical type | B | A | B | A | A | A |
| Example 5 | Optically vertical type | A | A | A | A | A | A |
| Example 6 | Optically vertical type | B | A | B | A | A | A |
| Example 7 | PSA | B | A | B | A | A | A |
| Example 8 | Optically horizontal type | B | A | B | A | A | A |
| Example 9 | Optically vertical type | A | A | A | A | A | A |
| Example 10 | Optically vertical type | A | A | A | A | A | A |
| Example 11 | Optically vertical type | B | A | B | A | A | A |
| Example 12 | Optically vertical type | A | A | A | A | A | A |
| Example 13 | Optically vertical type | A | A | A | A | B | A |
| Example 14 | Optically vertical type | A | A | A | A | B | A |
| Example 15 | Optically vertical type | A | A | A | A | B | A |
| Comparative Example 1 | Optically vertical type | C | B | C | A | A | A |
| Comparative Example 2 | Optically vertical type | X | X | X | X | X | X |
| Comparative Example 3 | PSA | B | B | B | A | A | C |
| Comparative Example 4 | Optically horizontal type | B | B | C | C | D | C |
| Comparative Example 5 | Optically vertical type | B | C | C | C | C | — |
| Comparative Example 6 | Optically vertical type | X | X | X | X | X | X |

In Comparative Example 5, in the obtained liquid crystal display element, liquid crystal alignment properties were poor and it was not possible to measure the pretilt angle θ2. Therefore, in Table 4, in evaluation of the placing resistance, "-" is shown.

As can be understood from the above results of the examples, in Examples 1 to 15 in which the liquid crystal aligning agent including the polymer [P] was used, coating properties (the irregular film thickness and the occurrence of pinholes, the edge shape, and film thickness uniformity) were all evaluated as "A" or "B." In addition, liquid crystal alignment properties and the voltage holding ratio of the shape was evaluated as "B," and the film thickness uniformity was evaluated as "C." In addition, in Comparative Example 4, while coating properties evaluated based on the irregular film thickness and the occurrence of pinholes were evaluated as "B," the film thickness uniformity was evaluated as "C," liquid crystal alignment properties were evaluated as "C," and the voltage holding ratio was evaluated as "D." In addition, compared to Example 7 according to the same PSA method, Comparative Example 3 had the inferior edge shape and placing resistance among coating properties to those of Example 7. In addition, in Comparative Example 5, the edge shape, the film thickness uniformity, the liquid crystal alignment properties, and the voltage holding ratio were evaluated as "C." Comparative Example 6 was an example in which the solvent composition of Comparative Example 1 was changed to a low boiling point solvent, but in Comparative Example 6, the polymer was not sufficiently dissolved and Comparative Example 6 was inferior to Examples 13 to 15.

Based on such results, it can be understood that, according to the liquid crystal aligning agent including the polymer [P], it is possible to form a liquid crystal alignment film having excellent coating properties (the irregular film thickness and the occurrence of pinholes, the edge shape, and film thickness uniformity), liquid crystal alignment properties, and voltage holding ratio. In addition, the liquid crystal aligning agent including the polymer [P] had excellent placing resistance.

What is claimed is:

1. A liquid crystal aligning agent, comprising:
a polymer [P] having a partial structure represented by Formula (1) and a photoalignable group;

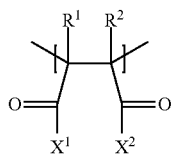

in Formula (1), $R^1$ and $R^2$ are independently a hydrogen atom, a halogen atom or a monovalent organic group having 1 or more carbon atoms; and $X^1$ and $X^2$ are independently —OH, —$NH_2$ or a monovalent organic group having 1 or more carbon atoms, wherein at least one of $X^1$ and $X^2$ is "—$OR^3$" or "—$NR^3R^4$", and $R^3$ and $R^4$ are independently a hydrogen atom or a monovalent organic group having 1 or more carbon atoms;
wherein the polymer [P] has at least one ring structure selected from the group consisting of rings represented by Formula (2) and cyclic carbonates;

in Formula (2), $Y^1$ is an oxygen atom, a sulfur atom or —$NR^3$—, wherein $R^3$ is a hydrogen atom or an alkyl group having 1 to 6 carbon atoms, $R^5$ is a single bond or a methylene group, and the polymer [P] is attached to the ring represented by Formula (2) via one of ring carbons of the ring represented by Formula (2).

2. The liquid crystal aligning agent according to claim 1, wherein the polymer [P] has a functional group that reacts with at least one ring structure selected from the group consisting of rings represented by Formula (2) and cyclic carbonates by heating.

3. The liquid crystal aligning agent according to claim 1, wherein the polymer [P] has at least one functional group selected from the group consisting of a carboxyl group and a protected carboxyl group.

4. The liquid crystal aligning agent according to claim 1, further comprising a polymer [Q] different from the polymer [P].

5. The liquid crystal aligning agent according to claim 4, wherein the polymer [Q] is at least one selected from the group consisting of a polyamic acid, a polyamic acid ester, a polyimide, and a polymer of monomers having an unsaturated bond.

6. A liquid crystal alignment film formed using the liquid crystal aligning agent according to claim 1.

7. A liquid crystal element comprising the liquid crystal alignment film according to claim 6.

8. A polymer having a partial structure represented by Formula (1) and having a photoalignable group;

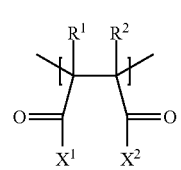

in Formula (1), $R^1$ and $R^2$ are independently a hydrogen atom, a halogen atom or a monovalent organic group having 1 or more carbon atoms, and $X^1$ and $X^2$ are independently —OH, —$NH_2$ or a monovalent organic group having 1 or more carbon atoms, wherein at least one of $X^1$ and $X^2$ is "—$OR^3$" or "—$NR^3R^4$", and $R^3$ and $R^4$ are independently a hydrogen atom or a monovalent organic group having 1 or more carbon atoms;
wherein the polymer has at least one ring structure selected from the group consisting of rings represented by Formula (2) and cyclic carbonates;

$$\text{(2)}$$

in Formula (2), $Y^1$ is an oxygen atom, a sulfur atom or —$NR^3$—, wherein $R^3$ is a hydrogen atom or an alkyl group having 1 to 6 carbon atoms, $R^5$ is a single bond or a methylene group, and the polymer is attached to the ring represented by Formula (2) via one of ring carbons of the ring represented by Formula (2).

9. The liquid crystal aligning agent according to claim 1, wherein the polymer [P] has at least one functional group selected from the group consisting of a carboxyl group and a protected carboxyl group.

10. The liquid crystal aligning agent according to claim 2, wherein the polymer [P] has at least one functional group selected from the group consisting of a carboxyl group and a protected carboxyl group.

11. The liquid crystal aligning agent according to claim 2, further comprising a polymer [Q] different from the polymer [P].

12. The liquid crystal aligning agent according to claim 3, further comprising a polymer [Q] different from the polymer [P].

13. The liquid crystal aligning agent according to claim 11, wherein the polymer [Q] is at least one selected from the group consisting of a polyamic acid, a polyamic acid ester, a polyimide, and a polymer of monomers having an unsaturated bond.

14. The liquid crystal aligning agent according to claim 12, wherein the polymer [Q] is at least one selected from the group consisting of a polyamic acid, a polyamic acid ester, a polyimide, and a polymer of monomers having an unsaturated bond.

* * * * *